(12) United States Patent
Smith et al.

(10) Patent No.: US 8,290,798 B1
(45) Date of Patent: Oct. 16, 2012

(54) DETERMINATION OF SURETY QUOTE METRIC

(75) Inventors: Kenneth C Smith, St. Louis, MO (US); Christopher M Tata, St. Louis, MO (US)

(73) Assignee: The Travelers Indemnity Company, Hartford, CT (US)

( * ) Notice: Subject to any disclaimer, the term of this patent is extended or adjusted under 35 U.S.C. 154(b) by 76 days.

(21) Appl. No.: 12/945,820

(22) Filed: Nov. 12, 2010

(51) Int. Cl.
*G06Q 40/00* (2006.01)
(52) U.S. Cl. ............ 705/4; 705/325; 705/7.25; 705/35; 705/36; 705/37; 705/38
(58) Field of Classification Search ................. 705/7.25, 705/35–38, 4, 325
See application file for complete search history.

(56) References Cited

U.S. PATENT DOCUMENTS

| | | | |
|---|---|---|---|
| 2005/0027645 A1* | 2/2005 | Lui et al. .......................... | 705/38 |
| 2009/0313051 A1* | 12/2009 | Van Slyke et al. ................ | 705/4 |
| 2010/0094744 A1* | 4/2010 | Van Slyke et al. .............. | 705/37 |
| 2011/0016056 A1* | 1/2011 | Hargroder ..................... | 705/325 |

OTHER PUBLICATIONS

Business Practice Manual for Credit Management, California ISO, Feb. 28, 2012.

* cited by examiner

*Primary Examiner* — Harish T Dass
(74) *Attorney, Agent, or Firm* — Carson C. K. Fincham; Fincham Downs, LLC

(57) ABSTRACT

Systems, apparatus, interfaces, methods, and articles of manufacture that provide for surety product underwriting. In some embodiments, for example, the process of underwriting (e.g., quoting and/or selling) surety products may be enhanced by calculating suggested magnitudes of credit to extend for any given customer and/or transaction. According to some embodiments, an interface for surety underwriting may be provided to facilitate and/or improve the underwriting process.

29 Claims, 14 Drawing Sheets

PROGRAM RELATIVITY

DETERMINATION OF SURETY QUOTE METRIC

BACKGROUND

Underwriters for companies that offer surety products to customers often rely on institutional knowledge and experience to determine how much credit to extend. The ability of these underwriters to balance the minimization of risk with the desire for customer accounts has great impact on the company's profitability and ultimate success. Yet despite the importance of these underwriting decisions to such companies, previous practices have failed to take into account information that may increase the overall profitability of surety products and have also failed to provide tools that allow underwriters to easily and efficiently conduct the underwriting process.

BRIEF DESCRIPTION OF THE DRAWINGS

An understanding of embodiments described herein and many of the attendant advantages thereof may be readily obtained by reference to the following detailed description when considered with the accompanying drawings, wherein:

FIG. 6 is an example interface according to some embodiments;

FIG. 10 is an example interface according to some embodiments;

FIG. 11 is an example interface according to some embodiments;

DETAILED DESCRIPTION

I. Introduction

Embodiments described herein are descriptive of systems, apparatus, interfaces, methods, and articles of manufacture for surety products. In some embodiments, for example, the process of underwriting (e.g., quoting and/or selling) surety products may be enhanced by calculating suggested magnitudes of credit to extend for any given customer and/or transaction. According to some embodiments, an interface for surety underwriting may be provided to facilitate and/or improve the underwriting process.

Figure 1:
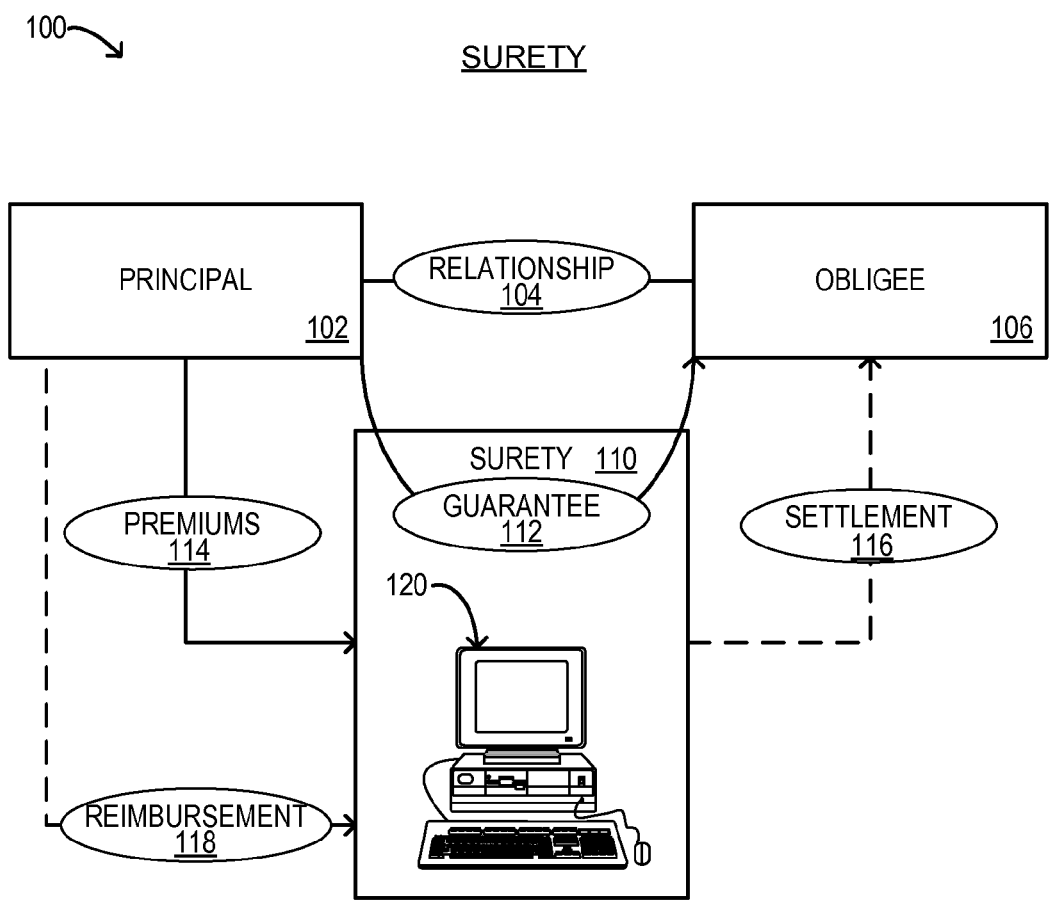
FIG. 1 is a block diagram of a system according to some embodiments.

Referring first to FIG. 1, for example, a block diagram of a system 100 according to some embodiments is shown. In some embodiments, the system 100 may comprise a principal entity 102 (e.g., an obligor) that enters into a relationship 104 (e.g., a services or other contract) with an obligee entity 106. As an assurance that the principal 102 will fulfill any obligations it may have pursuant to the relationship 104, the principal entity 102 may enter into a surety contract with a surety entity 110 (or guarantor) to provide a guarantee 112 to the obligee entity 106. The amount (or level) of the guarantee 112 provided by the surety entity 110 may be referred to as a level of credit, surety, surety credit, surety capacity and/or capacity. Moreover, the surety contract provided by the surety 110 entity may be referred to as a "surety product." In some embodiments, the surety entity 110 may comprise an "accommodation party" pursuant to Section 3 of the Uniform Commercial Code (UCC). In exchange for the guarantee 112, the principal entity 102 may often pay recurring premiums 114 (or price) (e.g., annually) to the surety entity 110 such as for annually renewing guarantees, or a one-time premium (or price) for fixed term guarantees. In the event that the principal 102 entity defaults, the surety entity 110 pays a settlement 116 to the obligee entity 106. The surety entity 110 may then pursue reimbursement 118 for the settlement 116 from the principal entity 102. The profit (or loss) to the surety entity 110 is based on the magnitude of the premiums 114 collected, the magnitude of any settlements 116 required to be paid out (less the reimbursements collected), as well as the efficiency of the underwriting process for the guarantee 112 (e.g., increased efficiency of the underwriting process decreases per-transaction costs, increasing overall revenues and profits).

According to some embodiments, the surety entity 110 may utilize a computerized processing device 120 such as a Personal Computer (PC), laptop computer, computer server, and/or other electronic device to manage and/or facilitate transactions and/or communications regarding the guarantee 112 (e.g., in an attempt to increase efficiency to realize improved profits related to surety underwriting). The surety entity 110 may, for example, utilize the computerized processing device 120 to (i) provide recommendations regarding the size and/or type of the guarantee 112 (e.g., surety credit) that should be offered to the principal entity 102, (ii) provide recommendations regarding the size and/or frequency of the premiums 114 that the principal entity 102 should pay in exchange for the guarantee 112, (iii) provide estimations of the expected magnitude and/or type of the settlement 116, and/or (iv) provide an interface via which the surety entity 110 may manage and/or facilitate underwriting of the guarantee 112 (e.g., in accordance with embodiments described herein).

According to some embodiments, for example, systems, apparatus, interfaces, methods, and articles of manufacture may comprise receiving information descriptive of (i) a net worth of a potential surety customer (e.g., the principal 102) and (ii) a credit rating of the potential surety customer. Embodiments may also or alternatively comprise calculating (i) a size scaling factor based on the net worth of the potential surety customer and (ii) a credit rating scaling factor, by dividing a credit rating scaling factor constant by a benchmark default probability that corresponds to the credit rating of the potential surety customer. Embodiments may also or alternatively comprise calculating a "program relativity" metric for each of a plurality of surety bond type buckets, by multiplying the size scaling factor, the credit rating scaling factor, and a bond obligation type scaling factor that corresponds to each of the plurality of surety bond type buckets.

Figure 2:
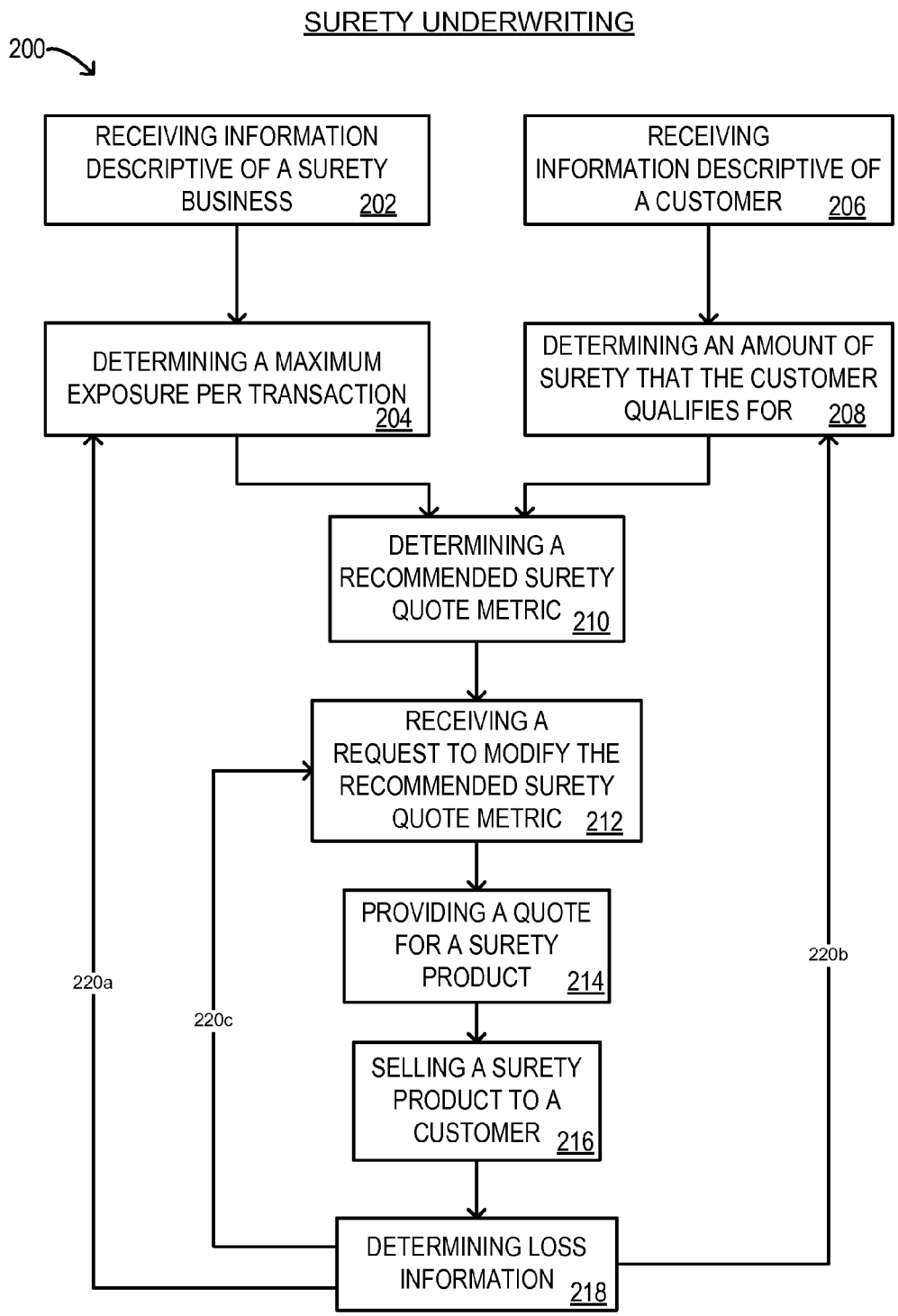
FIG. 2 is a flow diagram of a method according to some embodiments.

Some embodiments may comprise (i) selecting one of a set of maximum exposure matrices based on at least one of (i) the net worth of the potential surety customer and (ii) the credit rating of the potential surety customer, (ii) determining, based on the credit rating of the potential surety customer and based on the selected one of the set of maximum exposure matrices, a maximum exposure metric for each of the plurality of surety bond type buckets, and/or (iii) outputting a recommended surety quote metric for each of the plurality of surety bond type buckets, by outputting the lesser of the calculated program relativity metric and the maximum exposure metric for each of the plurality of surety bond type buckets (described in detail in conjunction with FIG. 2 herein).

Figure 5:
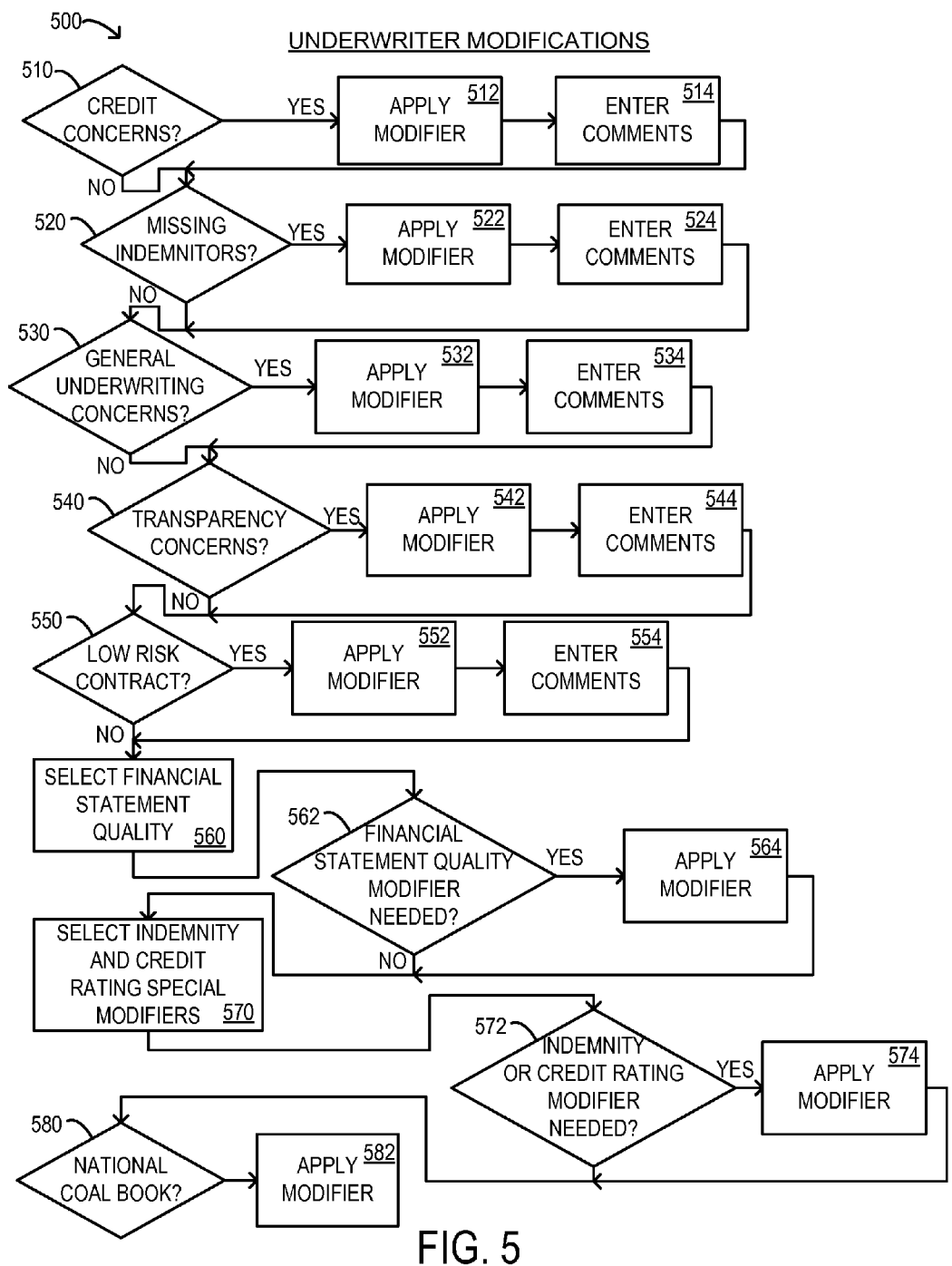
FIG. 5 is a functional diagram of a process according to some embodiments.

Some embodiments may comprise (i) providing a menu option for each of a plurality of underwriter modification metrics, (ii) receiving input via at least one of the menu options for the plurality of underwriter modification metrics, and/or (iii) modifying based on the input received via the at least one of the menu options for the plurality of underwriter modification metrics, the recommended surety quote metric for at least one of the plurality of surety bond type buckets (described in detail in conjunction with FIG. 5 herein).

Figure 3:
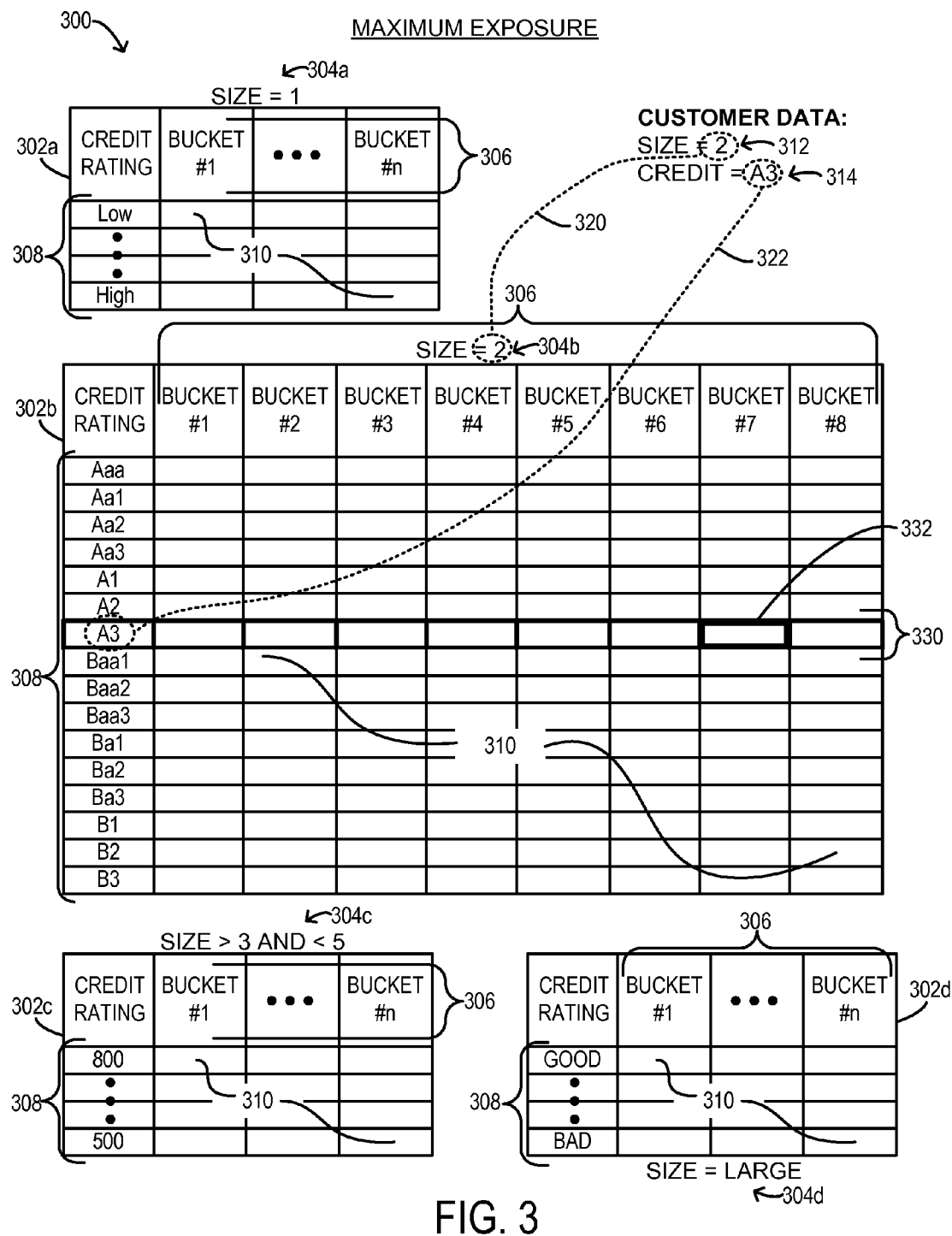
FIG. 3 is a functional diagram of a process according to some embodiments.

In some embodiments, the set of maximum exposure matrices may comprise a set of four (4) matrices (described in detail in conjunction with FIG. 3 herein). According to some embodiments, the plurality of surety bond type buckets may comprise eight (8) surety bond type buckets (described in detail in conjunction with FIG. 4 herein). While many thousand surety bond types may exist, for example, applicants have realized that it may be advantageous to aggregate various surety bond types into discrete "buckets" to facilitate increased efficiency in the surety bond underwriting process. In some embodiments, applicants have determined that a particular set of eight (8) surety type "buckets" may advantageously expedite and/or otherwise facilitate the underwriting process.

II. Terms and Definitions

Some embodiments described herein are associated with a "user device" or a "network device". As used herein, the terms "user device" and "network device" may be used interchangeably and may generally refer to any device that can communicate via a network. Examples of user or network devices include a Personal Computer (PC), a workstation, a server, a printer, a scanner, a facsimile machine, a copier, a Personal Digital Assistant (PDA), a storage device (e.g., a disk drive), a hub, a router, a switch, and a modem, a video game console, or a wireless phone. User and network devices may comprise one or more communication or network components.

As used herein, the term "network component" may refer to a user or network device, or a component, piece, portion, or combination of user or network devices. Examples of network components may include a Static Random Access Memory (SRAM) device or module, a network processor, and a network communication path, connection, port, or cable.

In addition, some embodiments are associated with a "network" or a "communication network". As used herein, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration of type that is or becomes known. Communication networks may include, for example, one or more networks configured to operate in accordance with the Fast Ethernet LAN transmission standard 802.3-2002® published by the Institute of Electrical and Electronics Engineers (IEEE). In some embodiments, a network may include one or more wired and/or wireless networks operated in accordance with any communication standard or protocol that is or becomes known or practicable.

As used herein, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard as defined by "Internet Protocol Version 6 (IPv6) Specification" RFC 1883, published by the Internet Engineering Task Force (IETF), Network Working Group, S. Deering et al. (December 1995). Information may, according to some embodiments, be compressed, encoded, encrypted, and/or otherwise packaged or manipulated in accordance with any method that is or becomes known or practicable.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

III. Processes

A. Surety Underwriting—Overview

Turning to FIG. 2, a flow diagram of a method 200 according to some embodiments is shown. In some embodiments, the method 200 may be performed and/or implemented by and/or otherwise associated with one or more specialized computerized processing devices (e.g., the computerized processing device 120 of FIG. 1), specialized computers, computer terminals, computer servers, computer systems and/or networks, and/or any combinations thereof (e.g., by one or more insurance company and/or surety underwriter computers). In some embodiments, the method 200 may be embodied in, facilitated by, and/or otherwise associated with various input mechanisms and/or interfaces such as the interfaces 600, 700, 800, 900, 1000, 1100 described with respect to FIG. 6, FIG. 7, FIG. 8, FIG. 9, FIG. 10, and/or FIG. 11 herein. The functional diagrams and flow diagrams described herein do not necessarily imply a fixed order to any depicted actions, steps, and/or procedures, and embodiments may generally be performed in any order that is practicable unless otherwise and specifically noted. Any of the processes and methods described herein may be performed and/or facilitated by hardware, software (including microcode), firmware, or any combination thereof. For example, a storage medium (e.g., a hard disk, Universal Serial Bus (USB) mass storage device, and/or Digital Video Disk (DVD)) may store thereon instructions that when executed by a machine (such as a computerized processing device) result in performance according to any one or more of the embodiments described herein.

In some embodiments, the method 200 may be illustrative of a process that occurs when a customer (e.g., the principal 102 of FIG. 1) requests a surety product (e.g., the guarantee 112 of FIG. 1) from a surety product underwriter (e.g., the surety 110 of FIG. 1). The method 200 may, for example, comprise receiving information descriptive of a surety business (e.g., descriptive of the business of the surety 110 of FIG. 1), at 202. Any appropriate and/or desired employee, agent, and/or other entity associated with the business may, for example, input business information into a software application and/or an interface (e.g., utilizing a computerized processing device such as the computerized processing device 120 of FIG. 1). Such information, according to some embodiments, may comprise (but is not limited to) business profitability, revenues, costs, overhead, default rates (e.g., regarding certain surety products and/or types of surety products), exposure, taxes, credit ratings and related information, any other financial and/or operational metric that is or becomes desirable, and/or any combination thereof. According to some embodiments, a computerized processing device such as a PC or computer server and/or a software program and/or interface may receive the business information at 202.

In some embodiments, the method 200 may comprise determining a maximum exposure per transaction (and/or per account), at 204. Based on the input and/or received business information, for example, a software program and/or computerized processing device may look-up, search, identify, calculate, and/or otherwise determine one or more maximum exposure metrics. Maximum exposure metrics are generally any parameters and/or values that are descriptive of maximum levels of potential liability (e.g., exposure) within which the business should seek (and/or is willing) to limit operations. While certain customers (e.g., the principal 102 of FIG. 1) may qualify for extremely large amounts of surety (e.g., in one or more surety type buckets as described herein), for example, even a remote possibility of default could therefore result in catastrophic loss for the business. Thus, the business may set limits on exposure levels for any given transaction (e.g., an "appetite" of the business for any particular surety product type) to avoid such situations. In some embodiments, the maximum exposure metric for any particular surety type may be calculated and stored in a table, database, and/or other file. In some embodiments, the maximum exposure metric may be determined by referencing, accessing, and/or otherwise utilizing one or more maximum exposure matrices such as those described in reference to FIG. 3 herein.

According to some embodiments, the method 200 may comprise receiving information descriptive of a customer (e.g., descriptive of the principal 102 of FIG. 1), at 206. Any appropriate and/or desired employee, agent, and/or other entity associated with a surety business may, for example, input customer information into a software application and/or an interface (e.g., utilizing a computerized processing device such as the computerized processing device 120 of FIG. 1). Such information, according to some embodiments, may comprise (but is not limited to) customer net worth, customer business revenues, profits, costs, overhead, liability, type of business, requested surety amount, requested surety type, default history, credit history, credit rating, identifying information, any other financial and/or operational metric that is or becomes desirable, and/or any combination thereof. In some embodiments, the customer information may comprise qualitative information such as an underwriter's personal assessment of the qualifications of the management team of a customer/customer's company (e.g., as determined through a face-to-face meeting. According to some embodiments, a computerized processing device such as a PC or computer server and/or a software program and/or interface may receive the customer information at 206.

In some embodiments, the customer information may be received in response to input and/or information provided by the customer (e.g., transmitted from a customer device and/or entered via an interface, such as at a kiosk). In some embodiments, the customer information may be received by any appropriate and/or desired employee, agent, and/or other entity associated with a surety business, who may in turn input or otherwise provide the customer information to a computerized processing device such as a surety company workstation and/or server (e.g., via a specialized surety underwriting interface—an exemplary version of which is described in detail in conjunction with FIG. 6, FIG. 7, FIG. 8, FIG. 9, FIG. 10, and FIG. 11 herein).

According to some embodiments, the method 200 may comprise determining an amount of surety that the customer qualifies for ("program relativity"), at 208. Based on the input and/or received customer information, for example, a software program and/or computerized processing device may look-up, search, identify, calculate, and/or otherwise determine one or more program relativity metrics. Program relativity metrics are generally any parameters and/or values that are descriptive of maximum levels of credit that the business should be (or is) willing to extend to the customer. According to some embodiments, a program relativity metric may be calculated and/or otherwise determined for each of a plurality of surety product types. In some embodiments, the program relativity metric for any particular surety type may be calculated and stored in a table, database, and/or other file. In some embodiments, the program relativity metric may be determined by referencing, accessing, and/or otherwise utilizing one or more program relativity matrices and/or by utilizing one or more calculation, such as those matrices and calculations described in reference to FIG. 4 herein.

The method 200 may, in some embodiments, comprise determining a recommended surety quote metric at 210, which is a maximum amount of surety (or surety capacity) that should be extended to a particular customer for a particular surety product type (or bond category or surety type buckets). Either or both of the maximum exposure metric(s) and the program relativity metric(s) may be utilized, for example, to look-up, query, derive, calculate, and/or otherwise determine the recommended surety quote metric. In some embodiments, the lesser of the maximum exposure metric and the program relativity metric for each of a plurality of surety type buckets may be determined and provided to an underwriter. The recommended surety quote metric may represent a guideline that an underwriter may utilize in determining how much surety credit to extend to a customer, or the recommended surety quote metric may comprise a ceiling limiting the amount of surety credit that an underwriter is allowed to extend. In some embodiments, the recommended surety quote metric may comprise a range within which the underwriter is guided or limited to provide a quote.

In some embodiments, the method 200 may comprise receiving a request to modify the recommended surety quote metric (described in detail in conjunction with FIG. 5 herein), at 212. The underwriter (and/or other entity associated with the surety business) may, for example, edit the recommended surety quote metric (e.g., utilizing an interface as described herein) and/or request that an edit and/or adjustment be made. In some embodiments, the underwriter (and/or other entity) may provide information relating to parameters and/or metrics that are externalities to the recommended surety quote metric determination and/or calculation process. In some embodiments, the ability of the underwriter to modify the recommended surety quote metric may be limited to a specific set of parameters and/or to within a specific range of magnitudes of modifications (e.g., ten percent (10%) to thirty percent (30%)). It may be desirable, for example, to allow the underwriter some degree of freedom in modifying and/or setting the amount of surety to be quoted, but keeping such modifications and/or quoting decisions within certain parameters (e.g., only allowing the underwriter to alter and/or deviate from the recommended surety quote metric based on a limited number of pre-defined parameters—e.g., provided via specific menu options in an interface for a surety underwriting application). It may also or alternatively be desirable to receive and/or record various notes and/or information descriptive of the reasons that the underwriter modified and/or deviated from the recommended surety quote metric.

The method 200 may, according to some embodiments, comprise providing a quote for a surety product, at 214. Based on the recommended surety quote metric provided at 210 and/or any modification and/or deviation there from noted at 212, for example, the underwriter may provide a quote for one or more surety products to the customer. In some embodiments, the underwriter may provide a quote for any number of surety products such as a quote for each of a plurality of surety type buckets as described herein. According to some embodiments, the underwriter may determine, define, generate, and/or otherwise identify the quote. The quote may then, for example, be provided, transmitted, displayed, and/or otherwise output to the customer via any methodology that is or becomes desirable or practicable. The quote provided by the surety entity may comprise one or more of the following: premium/price (which may include a high-risk price and/or a low-risk price), surety capacity (e.g., an aggregate line of credit), collateral requirements, indemnity requirements, international bond restrictions, surety product type restrictions, other risk bucket restrictions/exclusions, and financial reporting requirements.

In some embodiments, the method 200 may comprise selling a surety product to a customer, at 216. A surety sales agent (who may be the same as or different from the underwriter), for example, may receive an indication that the customer desires to purchase a surety product based on the quote provided at 214. The necessary paperwork and financial arrangements to consummate the sale of the surety product may be put in place, according to some embodiments, thus effectuating the sale of the surety product to the customer. In some embodiments, the sale may include post-sale activities such as receipt of premiums and revision and/or renewal of surety product terms or parameters.

According to some embodiments, the method 200 may comprise determining loss information, at 218. In the event that the customer defaults on an obligation which is the subject of the surety product purchased at 216, a loss event may occur. The surety business may be required to pay a settlement (e.g., the settlement 116 of FIG. 1) to a beneficiary (e.g., the obligee 106 of FIG. 1) of the surety product (e.g., the guarantee 112 of FIG. 1) and may be unable, for example, to recoup reimbursement for the full settlement amount from the customer (even if full reimbursement is possible, the necessity of conducting processes in response to the default may cause losses that may not be reimbursable—e.g., attorneys fees, staff salaries, and/or other administrative overhead or costs).

The method 200 may, in some embodiments, comprise utilizing loss information to modify rules, at 220a-c. Information associated with the loss event at 218, for example, may be utilized to (i) update formulas and/or calculations 220a that are utilized to determine maximum exposure metrics (e.g., at 204), (ii) update formulas and/or calculations 220b that are utilized to determine program relativity metrics (e.g., at 208), and/or (iii) update and/or otherwise influence information 220c (such as available menu items or underwriter guidance) regarding underwriter modifiers (e.g., such as those received at 212). Such a feedback loop may, in some embodiments, promote increased accuracy of surety product underwriting guidance and/or promote increased efficiency and/or profits associated with surety product underwriting and/or sales.

B. Surety Underwriting—Maximum Exposure

Referring now to FIG. 3, a functional diagram of a process 300 according to some embodiments is shown. In some embodiments, the process 300 may be performed and/or implemented by and/or otherwise associated with one or more specialized computerized processing devices (e.g., the computerized processing device 120 of FIG. 1), specialized computers, computer terminals, computer servers, computer systems and/or networks, and/or any combinations thereof (e.g., by one or more insurance company and/or surety underwriter computers). In some embodiments, the process 300 may be related to and/or comprise a portion of an underwriting process or method such as the determination of maximum exposure metrics at 204 of the method 200 of FIG. 2 herein. In some embodiments, the process 300 may be embodied in, facilitated by, and/or otherwise associated with various input mechanisms and/or interfaces such as the interfaces 600, 700, 800, 900, 1000, 1100 described with respect to FIG. 6, FIG. 7, FIG. 8, FIG. 9, FIG. 10, and/or FIG. 11 herein.

According to some embodiments, the process 300 may comprise referencing and/or utilizing a plurality of maximum exposure matrices 302a-d (or tables, databases, and/or other means for storing related data that are or become known or practicable). In some embodiments, such as depicted in FIG. 3, the maximum exposure matrices 302a-d may each be directed and/or applicable to a particular size metric 304a-d. The size metric 304a-d may comprise any indicator of size, strength, magnitude, and/or quality that is or becomes known or practicable. According to some embodiments, the size metrics 304a-d may comprise indicators of a net worth of a customer (e.g., a customer and/or potential customer of a surety product) and/or a range of net worth values or magnitudes.

In some embodiments, such as depicted in FIG. 3, the maximum exposure matrices 302a-d may comprise two-dimensional data sets that may, for example, relate (e.g., for each size metric 304a-d) a plurality of surety product type buckets 306 on a first axis (e.g., the x-axis) to credit ratings 308 on a second axis (e.g., the y-axis). According to some embodiments, the maximum exposure matrices 302a-d may be populated with maximum exposure metrics 310 for each credit rating 308 and for each surety product type bucket 306. In some embodiments, different forms, layouts, configurations, and/or different quantities of maximum exposure matrices 302a-d may be utilized in the process 300. The granularity, complexity, and/or dimensionality of the maximum exposure matrices 302a-d may, for example, vary as desired and/or may be tied to a particular surety product and/or offering.

According to some embodiments, as described in more detail with respect to the method 200 of FIG. 2 herein, the maximum exposure metrics 310 may be populated, defined, queried, identified, calculated, and/or otherwise determined based on various qualities and/or metrics associated with a surety business (e.g., profitability, cash flow, cash-on-hand, equity, risk, and/or empirical loss data—e.g., from 218 of FIG. 2). The maximum exposure metrics 310 may, represent for example, for each of the surety product type buckets 306 (and/or for each credit rating 308 and/or for each size metric 304a-d), a maximum amount of surety credit that the business is willing to extend for any given transaction (e.g., a desired maximum exposure per surety transaction entered into).

In some embodiments, the process 300 may comprise utilizing customer data such as customer size data 312 and/or customer credit rating data 314 to determine a maximum exposure metric 310 applicable to any transaction entered into with the customer. At 320, for example, the customer size data 312 (such as customer net worth) may be compared to the various size metrics 304a-d to determine which of the maximum exposure matrices 302a-d should be utilized to determine a maximum exposure metric 310 applicable to the customer. In the example depicted in FIG. 3, the customer size data 312 of "2" corresponds to the second size metric 304b (i.e., "2") of the second maximum exposure matrix 302b. In some embodiments, the process 300 may comprise utilizing the customer credit rating data 314 to determine which row of the selected/second maximum exposure matrix 302b should be referenced to determine maximum exposure metrics 310 for transactions with the customer, at 322. The example customer credit rating 314 of "aa", for example, corresponds to the credit rating 308 of "aa" in the second maximum exposure matrix 302b.

In some embodiments, the result of the process 300 may comprise an identification of a row of maximum exposure metrics 310 such as a row 330 depicted in FIG. 3, selected based on the example customer data 312, 314. In such a manner, for example, a maximum exposure metric 310 for each of the possible surety product type buckets 306 for which a transaction may be entered into with the customer, may be defined. According to some embodiments, such as in the case that a particular type of surety product (e.g., one or more of the surety product type buckets 306) is identified or selected (e.g., a particular type of surety product that the customer desires to acquire and/or that an underwriter desires to provide), the process 300 may result in identification of fewer than the full row 330 of maximum exposure metrics 310, such as a single selected maximum exposure metric 332.

C. Surety Underwriting—Program Relativity

Figure 4:
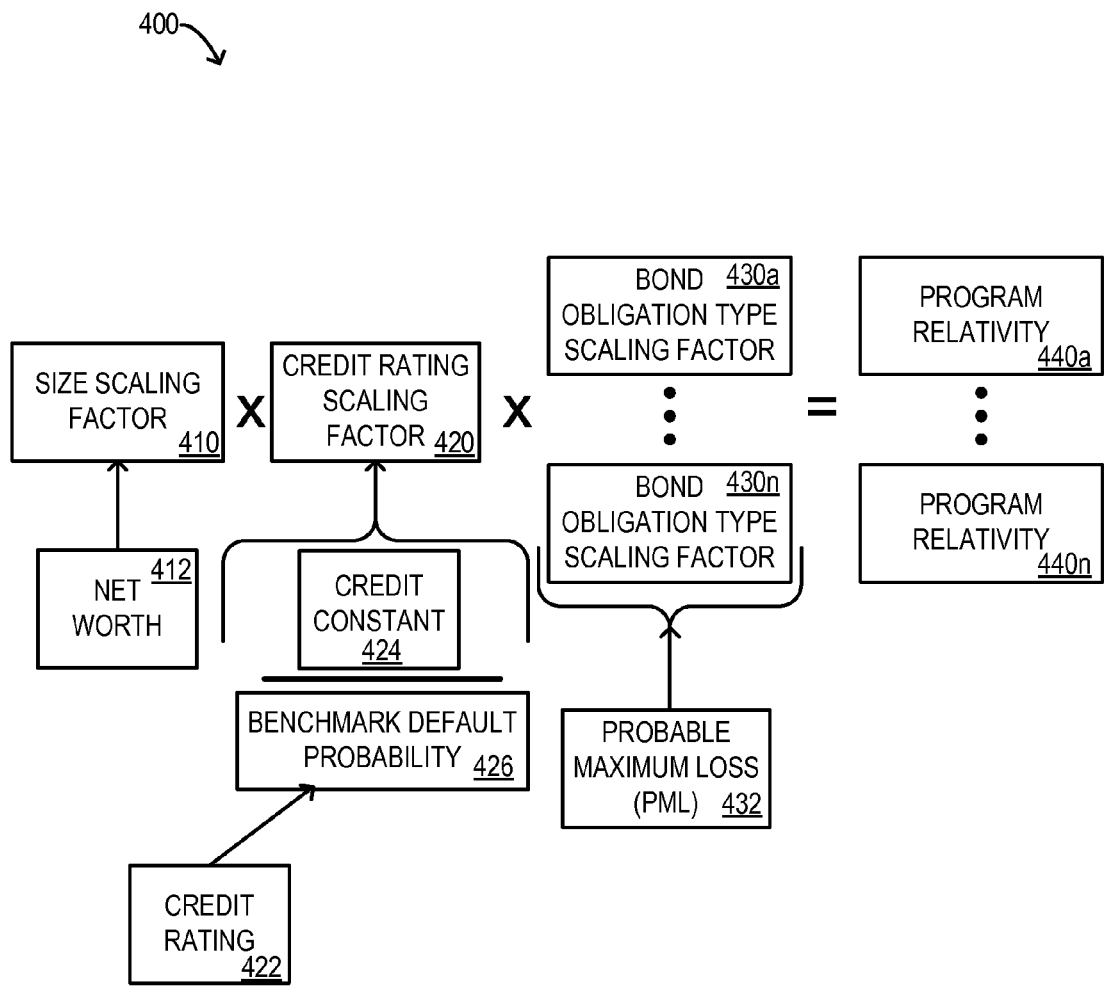
FIG. 4 is a functional diagram of a process according to some embodiments.

Referring now to FIG. 4, a functional diagram of a process 400 according to some embodiments is shown. In some embodiments, the process 400 may be performed and/or implemented by and/or otherwise associated with one or more specialized computerized processing devices (e.g., the computerized processing device 120 of FIG. 1), specialized computers, computer terminals, computer servers, computer systems and/or networks, and/or any combinations thereof (e.g., by one or more insurance company and/or surety underwriter computers). In some embodiments, the process 400 may be related to and/or comprise a portion of an underwriting process or method such as the determination of program relativity metrics at 208 of the method 200 of FIG. 2 herein. In some embodiments, the process 400 may be embodied in, facilitated by, and/or otherwise associated with various input mechanisms and/or interfaces such as the interfaces 600, 700, 800, 900, 1000, 1100 described with respect to FIG. 6, FIG. 7, FIG. 8, FIG. 9, FIG. 10, and/or FIG. 11 herein.

According to some embodiments, the process 400 may comprise determining a size scaling factor 410. The size scaling factor 410 may, for example, comprise a metric based on one or more size parameters associated with a surety customer. In some embodiments, such as depicted in FIG. 4, the size scaling factor 410 may be based on a net worth 412 of the customer (and/or of a business of the customer). According to some embodiments, the process 400 may comprise determining a credit rating factor 420. The credit rating factor 420 may, for example, be based on one or more credit ratings 422 and/or credit parameters of the customer (and/or the customer's business). In some embodiments (as depicted in FIG. 4), the credit rating factor 420 may comprise a calculation such as dividing a credit constant 424 by a benchmark default probability 426 corresponding to the credit rating 422 of the customer.

The process 400 may, in some embodiments, comprise determining one or more bond obligation type scaling factors 430. A bond obligation type scaling factor 430 may comprise, for example, a weight metric corresponding to one or more particular surety bond types (e.g., one or more of the surety bond type buckets as described herein). In some embodiments, the bond obligation type scaling factor 430 may be determined for each of a plurality of surety bond type buckets. According to some embodiments, the bond obligation type scaling factor 430 may comprise and/or be based upon a Probable Maximum Loss (PML) 432 assumption for a given surety bond type (which may also be known as a Loss Given Default (LGD) factor).

In some embodiments, a program relativity 440a-n may be determined. As depicted in FIG. 4, for example, the size scaling factor 410, the credit rating scaling factor 420, and the bond obligation type scaling factor 430a-n may be multiplied to yield the program relativity 440a-n for a given customer/ transaction/account. In some embodiments, the program relativity 440a-n may be calculated and/or otherwise determined for each of the plurality of surety bond type buckets (e.g., the surety product type buckets 306 of FIG. 3). According to some embodiments, such as described in relation to the method 200 of FIG. 2 herein, the program relativity 440a-n may be compared (and//or contrasted) with one or more maximum exposure metrics (e.g., the maximum exposure metrics 310 of FIG. 3 herein) to provide and/or determine a recommended surety quote metric (e.g., at 210 of the method 200 of FIG. 2 herein).

In some embodiments, fewer or more factors 410,420, 430a-n may be utilized to calculate the program relativity 440a-n. Other factors (not explicitly shown in FIG. 4), such as an expense scaling factor (e.g., to account for additional expense associated with underwriting certain accounts or certain bond obligation types), for example, may also or alternatively be included in the process 400, as is or becomes practicable or desirable.

D. Surety Underwriting—Underwriter Modifications

Referring now to FIG. 5, a functional diagram of a process 500 according to some embodiments is shown. In some embodiments, the process 500 may be performed and/or implemented by and/or otherwise associated with one or more specialized computerized processing devices (e.g., the computerized processing device 120 of FIG. 1), specialized computers, computer terminals, computer servers, computer systems and/or networks, and/or any combinations thereof (e.g., by one or more insurance company and/or surety underwriter computers). In some embodiments, the process 500 may be related to and/or comprise a portion of an underwriting process or method such as receiving a request to modify the recommended surety quote metric at 212 of the method 200 of FIG. 2 herein.

According to some embodiments, the process 500 may comprise determining if there are any credit concerns, at 510. If there are any potential credit issues that are not taken into account by a customer's credit rating, for example, an underwriter may provide an indication that such concerns exist. In the case that credit concerns are indicated as existing, a modifier may be applied at 512. In some embodiments, the underwriter (and/or other entity associated with a surety business) may choose from a list of available modifiers—this may be considered a "manual" underwriter modification. According to some embodiments, the underwriter may indicate that the concerns exist and/or may select from a list of choices related to the indicated concern, but the modifier(s) may be applied by an underwriting program and/or interface—this may be considered an "automatic" underwriter modification. In some embodiments, the underwriter may select from a list of several pre-determined modifiers such as (but not limited to) a ten percent (10%), twenty percent (20%), and/or thirty percent (30%) reduction of a recommended surety quote metric (e.g., the surety quote metric determined at 210 of the method 200 of FIG. 2). In some embodiments, although the credit concern may be indicated and/or identified, no modification may be applied and/or a "no modification" option may be selected (and/or an indication thereof received). The process 500 may also or alternatively comprise entering comments at 514. The underwriter may enter comments descriptive of the credit concern(s) and/or the selected and/or applied modifier, for example. In some embodiments, the surety underwriting program and/or interface may receive an indication of the comments and/or store indications of the comments. According to some embodiments, such as in the case that no credit concerns are determined at 510 and/or in the case that comments have been entered at 514, the process 500 may continue.

In some embodiments, the process 500 may comprise determining if there are any missing indemnitors or a diluted indemnity form/contract, at 520. If a customer is associated with a weak indemnity package, for example, an underwriter may provide an indication that such concerns exist. In the case that the weak indemnity package is indicated as being an issue, a modifier may be applied at 522. The modifier may be applied as a "manual" and/or "automatic" underwriter modification, as desired. In some embodiments, the underwriter may select from a list of several pre-determined modifiers such as (but not limited to) a ten percent (10%), twenty percent (20%), and/or thirty percent (30%) reduction of a recommended surety quote metric (e.g., the surety quote metric determined at 210 of the method 200 of FIG. 2). In some embodiments, although the weak indemnity package may be indicated and/or identified as a concern, no modification may be applied and/or a "no modification" option may be selected (and/or an indication thereof received). The process 500 may also or alternatively comprise entering comments at 524. The underwriter may enter comments descriptive of the weak indemnity package and/or related concerns and/or the selected and/or applied modifier, for example. In some embodiments, the surety underwriting program and/or interface may receive an indication of the comments and/or store indications of the comments. According to some embodiments, such as in the case that no weak indemnity package is determined at 520 and/or in the case that comments have been entered at 524, the process 500 may continue.

According to some embodiments, the process 500 may comprise determining if there are any general underwriting concerns, at 530. If there are any potential general underwriting issues that are not already taken into account (such as an abbreviated underwriting process), for example, an underwriter may provide an indication that such concerns exist. In the case that general underwriting concerns are indicated as existing, a modifier may be applied at 532. The modifier may be applied as a "manual" and/or "automatic" underwriter modification, as desired. In some embodiments, the underwriter may select from a list of several pre-determined modifiers such as (but not limited to) a ten percent (10%), twenty percent (20%), and/or thirty percent (30%) reduction of a recommended surety quote metric (e.g., the surety quote metric determined at 210 of the method 200 of FIG. 2). In some embodiments, although the general underwriting concern may be indicated and/or identified, no modification may be applied and/or a "no modification" option may be selected (and/or an indication thereof received). The process 500 may also or alternatively comprise entering comments at 534. The underwriter may enter comments descriptive of the general underwriting concern(s) and/or the selected and/or applied modifier, for example. In some embodiments, the surety underwriting program and/or interface may receive an indication of the comments and/or store indications of the comments. According to some embodiments, such as in the case that no general underwriting are determined at 530 and/or in the case that comments have been entered at 534, the process 500 may continue.

In some embodiments, the process 500 may comprise determining if there are any transparency concerns, at 540. If there are any potential transparency issues such as the existence of slow financial reporting, for example, an underwriter may provide an indication that such concerns exist. In the case that transparency concerns are indicated as existing, a modifier may be applied at 542. The modifier may be applied as a "manual" and/or "automatic" underwriter modification, as desired. In some embodiments, the underwriter may select from a list of several pre-determined modifiers such as (but not limited to) a ten percent (10%), twenty percent (20%), and/or thirty percent (30%) reduction of a recommended surety quote metric (e.g., the surety quote metric determined at 210 of the method 200 of FIG. 2). In some embodiments, although the transparency concern(s) may be indicated and/or identified, no modification may be applied and/or a "no modification" option may be selected (and/or an indication thereof received). The process 500 may also or alternatively comprise entering comments at 544. The underwriter may enter comments descriptive of the transparency concern(s) and/or the selected and/or applied modifier, for example. In some embodiments, the surety underwriting program and/or interface may receive an indication of the comments and/or store indications of the comments. According to some embodiments, such as in the case that no transparency concerns are determined at 540 and/or in the case that comments have been entered at 544, the process 500 may continue.

According to some embodiments, the process 500 may comprise determining if there is a low risk contract, at 550. If there is a low risk bond obligation (e.g., a short-duration contract), for example, an underwriter may provide an indication that such an issue exist. In the case that a low risk contract is indicated as existing, a modifier may be applied at 552. The modifier may be applied as a "manual" and/or "automatic" underwriter modification, as desired. In some embodiments, the underwriter may select from a list of several pre-determined modifiers such as (but not limited to) a one hundred percent (100%), seventy-five percent (75%), fifty percent (50%), and/or twenty-five percent (25%) increase of a recommended surety quote metric (e.g., the surety quote metric determined at 210 of the method 200 of FIG. 2). In some embodiments, although the low risk contract may be indicated and/or identified, no modification may be applied and/or a "no modification" option may be selected (and/or an indication thereof received). The process 500 may also or alternatively comprise entering comments at 554. The underwriter may enter comments descriptive of the low risk contract and/or the selected and/or applied modifier, for example. In some embodiments, the surety underwriting program and/or interface may receive an indication of the comments and/or store indications of the comments. According to some embodiments, such as in the case that no low risk contract is determined at 550 and/or in the case that comments have been entered at 554, the process 500 may continue.

In some embodiments, the process 500 may comprise selection of a financial statement quality, at 560. An indication may be received from an underwriter describing and/or identifying a quality metric associated with a financial statement of a customer (or potential customer), for example, or the quality may be automatically determined (e.g., by analyzing various metrics associated with the financial statement and/or applying stored rules and/or guidelines thereto). According to some embodiments, the process 500 may comprise determining if a financial statement modifier is needed, at 562. If there are any financial statement quality issues, for example, an underwriter may provide an indication that such issues exist or an underwriting application may automatically determine if the quality warrants application of a modifier. In some embodiments, the determining of whether or not a modifier is needed (and/or desired) due to financial statement quality may be conducted in response to the determination of the financial statement quality at 560.

In the case that financial statement quality concerns are indicated as existing, a modifier may be applied at 564. The modifier may be applied as a "manual" and/or "automatic" underwriter modification, as desired. In some embodiments, based on a selection by an underwriter (and/or based on a receipt of an indication of such a selection) of a financial statement quality (e.g., "audit", "review", "compilation", and/or "internal"), an underwriting program and/or application may automatically select from a list of several pre-determined modifiers such as (but not limited to) a zero percent (0%), ten percent (10%), seventy-five percent (75%), and/or ninety percent (90%) reduction of a recommended surety quote metric (e.g., the surety quote metric determined at 210 of the method 200 of FIG. 2). In some embodiments, the selected modifier(s) may correspond to a particular financial statement quality (or range of qualities) associated with a particular customer and/or class of customer. According to some embodiments, such as in the case that no financial statement quality issues are determined at 560, the process 500 may continue.

According to some embodiments, the process 500 may comprise selection of indemnity and credit rating special modifiers, at 570. An indication may be received from an underwriter describing and/or identifying indemnity and/or credit rating special modifiers, for example, or the indemnity and/or credit rating special modifiers may be automatically determined (e.g., by analyzing various metrics associated with the credit rating and/or indemnity information of a customer and/or applying stored rules and/or guidelines thereto). According to some embodiments, the process 500 may comprise determining if indemnity and/or credit rating special modifiers are needed, at 572. If there are any indemnity and/or credit rating special modifier issues, for example, an underwriter may provide an indication that such issues exist or an underwriting application may automatically determine if the indemnity and/or credit rating special modifiers warrant application of a modifier. In some embodiments, the determining of whether or not a modifier is needed (and/or desired) due to indemnity and/or credit rating special modifiers may be conducted in response to the determination of the indemnity and/or credit rating special modifiers at 570.

In the case that indemnity and/or credit rating special modifiers are indicated as warranting application of a modifier, a modifier may be applied at 574. The modifier may be applied as a "manual" and/or "automatic" underwriter modification, as desired. In some embodiments, based on a selection by an underwriter (and/or based on a receipt of an indication of such a selection) of a indemnity and/or credit rating special modifier (e.g., "enhanced indemnity", "enhanced indemnity set for one hundred percent (100%) collateral", "Form B indemnity", and/or "public credit rating"), an underwriting program and/or application may automatically select from a list of several pre-determined modifiers and/or may automatically set various appropriate corresponding flags, thresholds (such as a collateral threshold), and/or triggers within the underwriting program. According to some embodiments, such as in the case that no indemnity and/or credit rating special modifiers are determined at 570, the process 500 may continue.

According to some embodiments, the process 500 may comprise determining if an account is a "special industry" account (e.g., an account for a customer listed in a "National Coal Book"), at 580. If the account is for a customer listed as a large national coal company and/or associated with another pre-defined "special industry", for example, an underwriter may provide an indication that such a designation exist. In the case that a large national coal or other special industry account is indicated as existing, a modifier may be applied at 582. The modifier may be applied as a "manual" and/or "automatic" underwriter modification, as desired. In some embodiments, although the special industry account may be indicated and/or identified, no modification may be applied and/or a "no modification" option may be selected (and/or an indication thereof received). According to some embodiments, such as in the case that no special industry account is determined at 580 and/or in the case that a modifier has been applied at 582, the process 500 may end.

It should be understood that the process 500 and the various procedures and/or steps described in reference thereto are intended to be exemplary in nature. Fewer or more procedures, steps, decisions, flow diagram elements, and/or components may be included in the process 500 as is or becomes desirable and/or practicable. The order of any procedures, steps, and/or flow diagram elements of the process 500 is also exemplary in nature. Procedures, steps, and/or elements may be deleted, excluded, and/or removed from the process 500 and/or may not be active or practiced in every occurrence and/or implementation of the process 500.

While some procedures are described as including and/or being associated with the entering and/or receiving of comments, fewer or more procedures may include and/or be associated with comment entry. Similarly, while application of some procedures and some modifiers may be described as comprising "manual" and/or "automatic" underwriter modifications, fewer or more procedures may be conducted via "manual", "automatic", and/or a combination of "manual" and "automatic" underwriting modifiers, as is or becomes desirable and/or practicable. In some embodiments, the process 500 may be embodied in, facilitated by, and/or otherwise associated with various input mechanisms and/or interfaces such as the interfaces 600, 700, 800, 900, 1000, 1100 described with respect to FIG. 6, FIG. 7, FIG. 8, FIG. 9, FIG.

Figure 11:
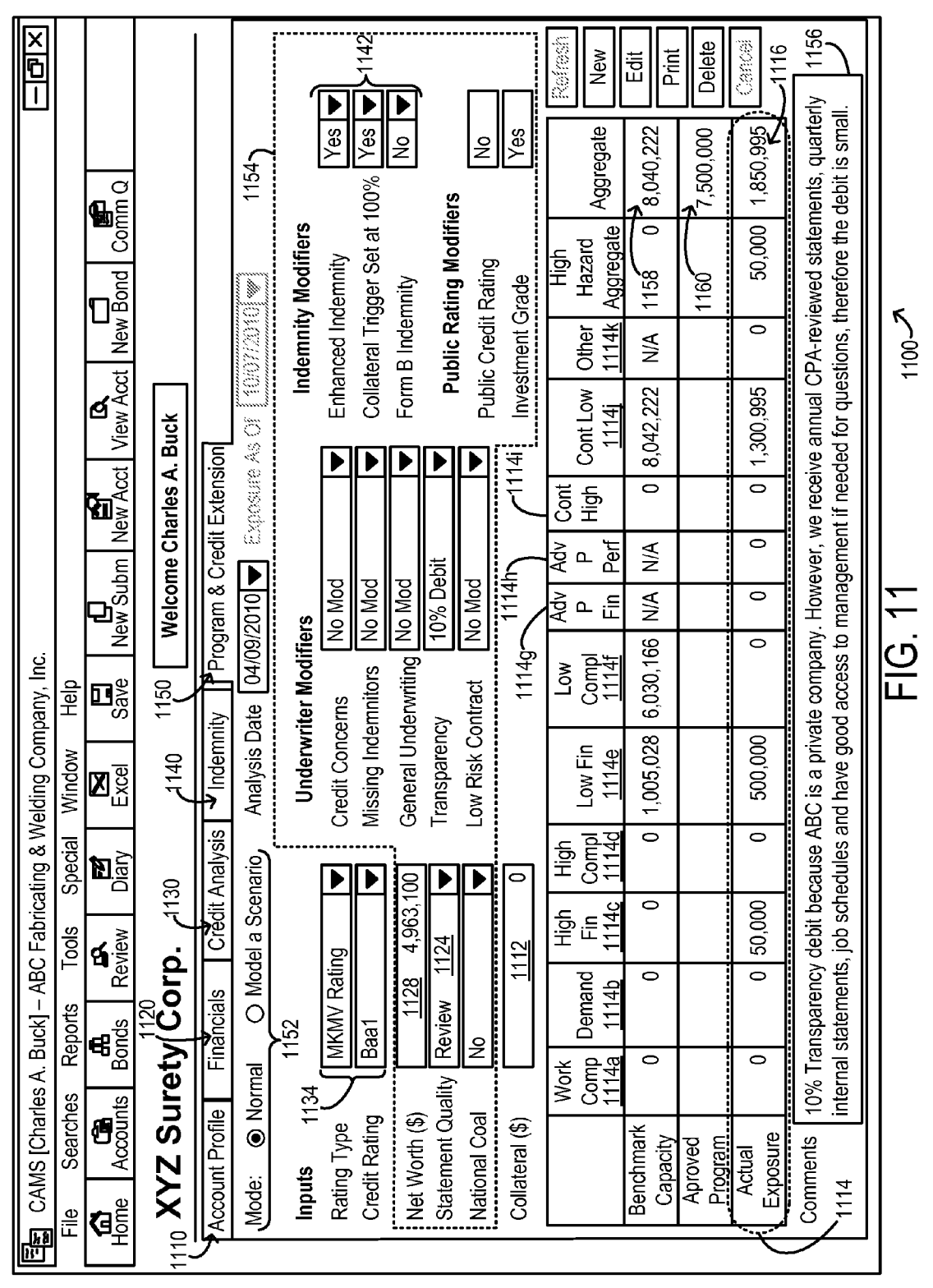

10, and/or FIG. 11 herein. In some embodiments, the underwriter may comprise an expert computer system that identifies the concerns 510, 520, 530, 540, 550, 562, 572, 580 and applies the appropriate modifiers 512, 522, 532, 542, 552, 564, 574, 582.

IV. Interfaces

Figure 6:
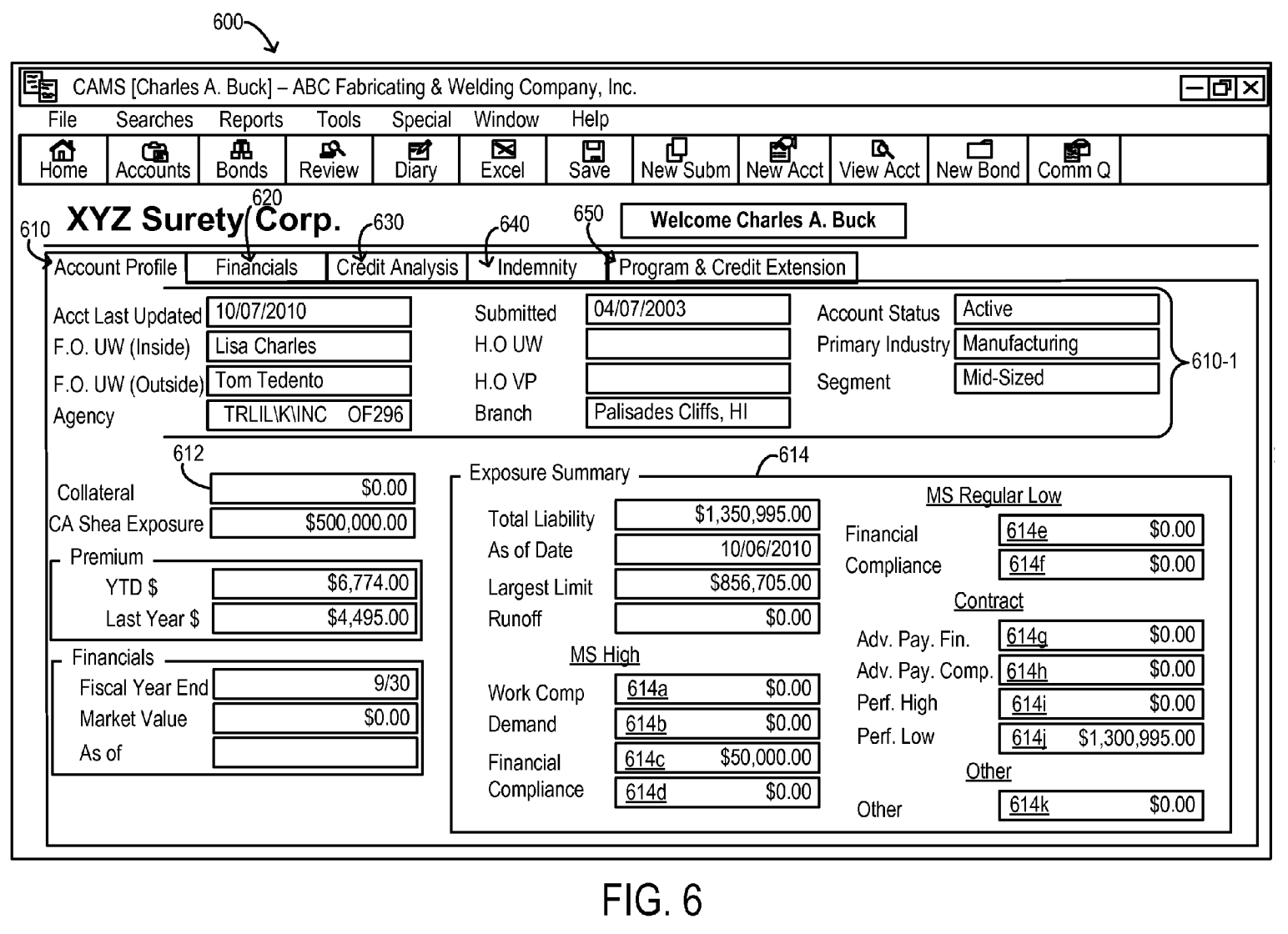

Turning now to FIG. 6, an example interface 600 according to some embodiments is shown. In some embodiments, the interface 600 may comprise a web page, web form, database entry form, Application Program Interface (API), spreadsheet, table, and/or application or other Graphical User Interface (GUI) via which an underwriter (or other entity) may enter data to conduct and/or facilitate a surety underwriting and/or sales process. The interface 600 may, for example, comprise a front-end of a surety underwriting program and/or platform programmed and/or otherwise configured to execute, conduct, and/or facilitate any of the various processes 300, 400, 500 of FIG. 3, FIG. 4, and/or FIG. 5 and/or the method 200 of FIG. 2, and/or portions or combinations thereof. In some embodiments, the interface 600 may be output via a computerized device such as the computerized processing device 120 of FIG. 1.

According to some embodiments, the interface 600 may comprise one or more tabs and/or other segmented and/or logical-presented data forms such as an account profile tab 610. In some embodiments, the account profile tab 610 may be configured and/or organized to allow and/or facilitate entry of general information regarding a surety account (and/or potential surety account). As depicted, for example, an area (e.g., one or more data entry mechanisms, tools, objects, and/or features) may be provided such that general data 610-1 descriptive of an account may be entered. In some embodiments, the account profile tab 610 may comprise one or more areas via which information descriptive of collateral 612 of an account and/or customer may be entered. According to some embodiments, the account profile tab 610 may comprise one or more areas via which information descriptive of account exposure 614 may be provided and/or otherwise indicated.

As depicted in FIG. 6, in some embodiments the account exposure 614 may be represented for a plurality of surety bond risk buckets 614a-k, as described herein. The interface 600 may also or alternatively comprise one or more other tabs such as a financials tab 620, a credit analysis tab 630, an indemnity tab 640, and/or a program and credit extension tab 650. These other tabs 620, 630, 640, 650 may, for example, include areas for entry of other account, customer, and/or surety business information (e.g., customer data 1292 and/or surety business data 1294 as described with respect to FIG. 12 herein). In some embodiments, all desired information may be aggregated and/or otherwise processed (e.g., in accordance with the method 200 of FIG. 2 and/or in accordance with any of the processes 300, 400, 500 of FIG. 3, FIG. 4, and/or FIG. 5 herein) and may be presented on the program and credit extension tab 650, for example, to provide a recommended surety quote metric (e.g., at 214 of the method 200 of FIG. 2)—e.g., for each of the desired and/or applicable surety bond risk buckets 614a-k.

Figure 7:
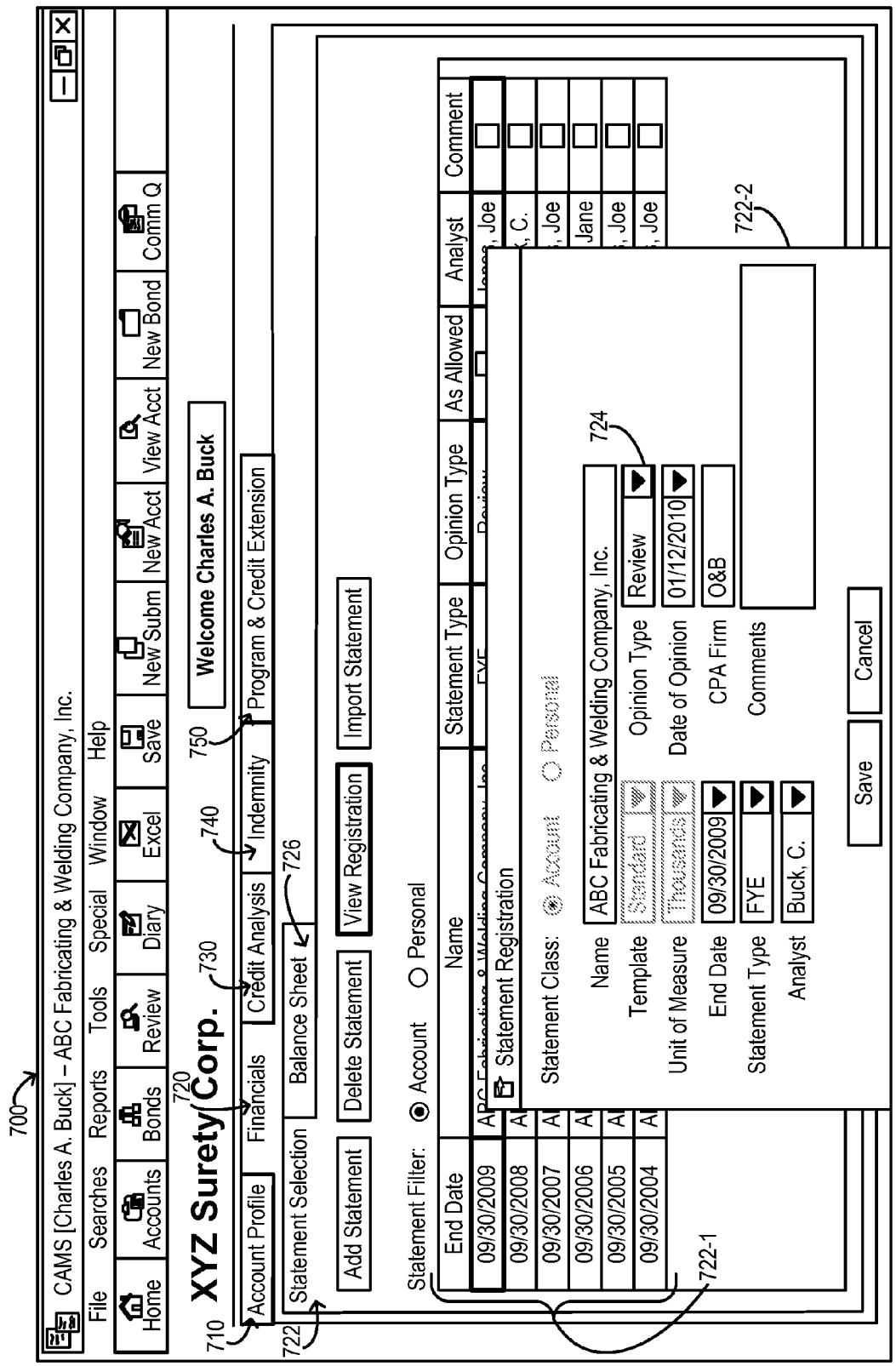
FIG. 7 is an example interface according to some embodiments.

Turning now to FIG. 7, an exemplary interface 700 according to some embodiments is shown. In some embodiments, the interface 700 may comprise a web page, web form, database entry form, Application Program Interface (API), spreadsheet, table, and/or application or other Graphical User Interface (GUI) via which an underwriter (or other entity) may enter data to conduct and/or facilitate a surety underwriting and/or sales process. The interface 700 may, for example, comprise a front-end of a surety underwriting program and/or platform programmed and/or otherwise configured to execute, conduct, and/or facilitate any of the various processes 300, 400, 500 of FIG. 3, FIG. 4, and/or FIG. 5 and/or the method 200 of FIG. 2, and/or portions or combinations thereof. In some embodiments, the interface 700 may be output via a computerized device such as the computerized processing device 120 of FIG. 1. According to some embodiments, the interface 700 may be similar in configuration and/or functionality to the interface 600 described in conjunction with FIG. 6 herein. Components of the interface 700 may, for example, be similar in configuration and/or functionality to any similarly-named and/or numbered components of the interface 600.

According to some embodiments, the interface 700 may comprise one or more tabs and/or other segmented and/or logical-presented data forms such as an account profile tab 710 and/or a financials tab 720. In some embodiments, the financials tab 720 may be configured and/or organized to allow and/or facilitate entry of data regarding financial statements of a surety account (and/or potential surety account). As depicted, for example, the financials tab 720 may comprise one or more sub-tabs such as a statement selection tab 722. In some embodiments, the statement selection tab 722 may comprise an area (e.g., one or more data entry mechanisms, tools, objects, and/or features) such that one or more financial statements 722-1 descriptive of an account may be entered and/or listed. In some embodiments, the statement selection tab 722 may comprise a pop-up window and/or supplemental screen such as a statement registration window 722-2, as depicted. The statement registration window 722-2 may comprise, for example, one or more areas via which information descriptive of a financial statement quality 724 of an account and/or customer may be entered. According to some embodiments, the financial statement quality 724 may correspond to a particular financial statement 722-1 listed on the statement selection tab 722. In some embodiments, the financials tab 720 may comprise one or more other sub-tabs such as a balance sheet tab 726, as shown.

According to some embodiments the interface 700 may also or alternatively comprise one or more other tabs such as a credit analysis tab 730, an indemnity tab 740, and/or a program and credit extension tab 750. These other tabs 730, 740, 750 may, for example, include areas for entry of other account, customer, and/or surety business information (e.g., customer data 1292 and/or surety business data 1294 as described with respect to FIG. 12 herein). In some embodiments, all desired information may be aggregated and/or otherwise processed (e.g., in accordance with the method 200 of FIG. 2 and/or in accordance with any of the processes 300, 400, 500 of FIG. 3, FIG. 4, and/or FIG. 5 herein) and may be presented on the program and credit extension tab 750, for example, to provide a recommended surety quote metric (e.g., at 214 of the method 200 of FIG. 2)—e.g., for each of a plurality of desired and/or applicable surety bond risk buckets as described herein.

Figure 8:
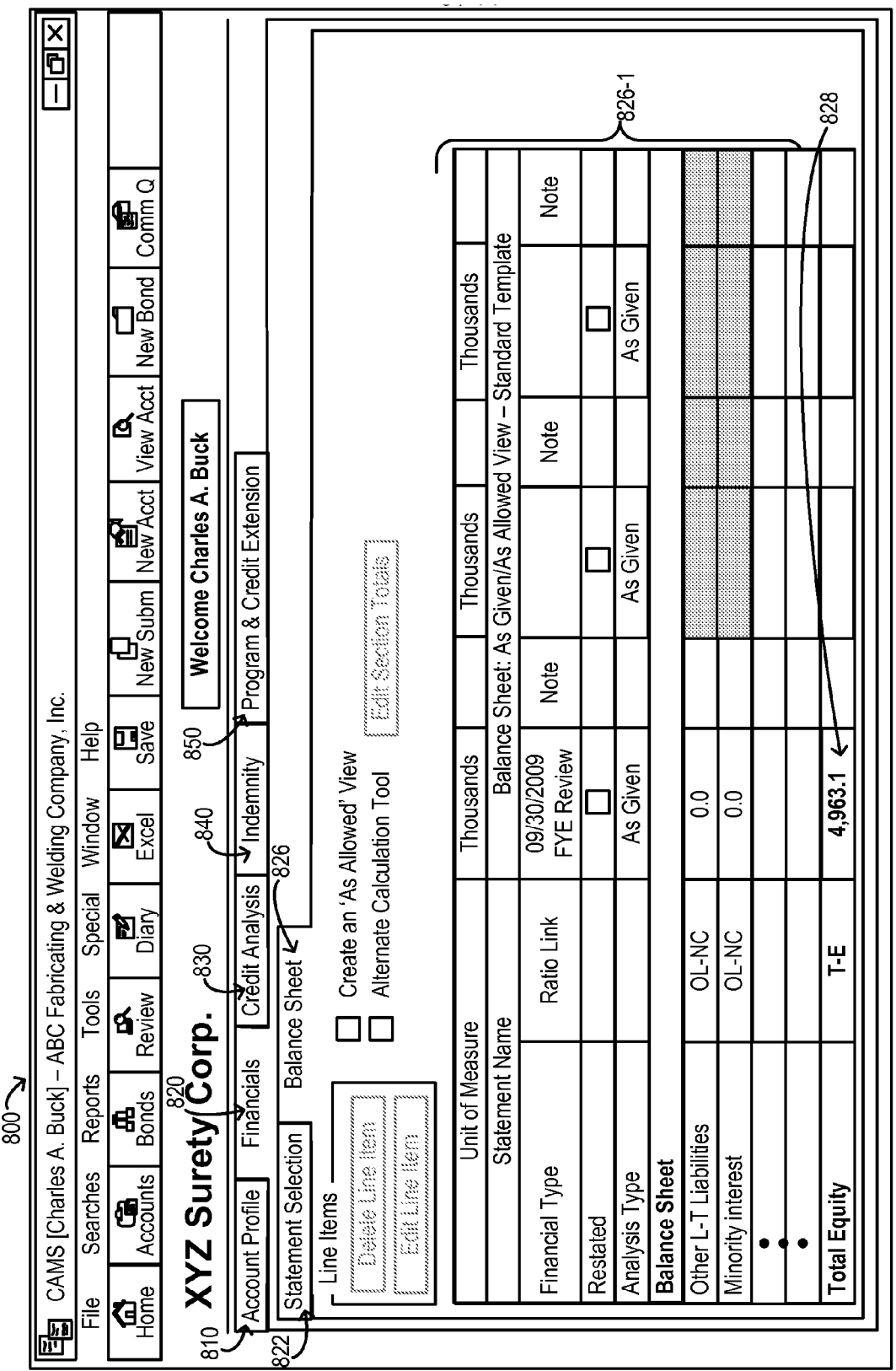
FIG. 8 is an example interface according to some embodiments.

Turning now to FIG. 8, an exemplary interface 800 according to some embodiments is shown. In some embodiments, the interface 800 may comprise a web page, web form, database entry form, Application Program Interface (API), spreadsheet, table, and/or application or other Graphical User Interface (GUI) via which an underwriter (or other entity) may enter data to conduct and/or facilitate a surety underwriting and/or sales process. The interface 800 may, for example, comprise a front-end of a surety underwriting program and/or platform programmed and/or otherwise configured to execute, conduct, and/or facilitate any of the various processes 300, 400, 500 of FIG. 3, FIG. 4, and/or FIG. 5 and/or the method 200 of FIG. 2, and/or portions or combinations thereof. In some embodiments, the interface 800 may be output via a computerized device such as the computerized processing device 120 of FIG. 1. According to some embodiments, the interface 800 may be similar in configuration and/or functionality to the interfaces 600, 700 described in conjunction with FIG. 6 and/or FIG. 7 herein. Components of the interface 800 may, for example, be similar in configuration and/or functionality to any similarly-named and/or numbered components of the interfaces 600, 700.

According to some embodiments, the interface 800 may comprise one or more tabs and/or other segmented and/or logical-presented data forms such as an account profile tab 810 and/or a financials tab 820. In some embodiments, the financials tab 820 may be configured and/or organized to allow and/or facilitate entry of data regarding financial statements and/or net worth of a surety account (and/or potential surety account). As depicted, for example, the financials tab 820 may comprise one or more sub-tabs such as a statement selection tab 822 and/or a balance sheet tab 826. In some embodiments, the balance sheet tab 826 may comprise an area (e.g., one or more data entry mechanisms, tools, objects, and/or features) such that information descriptive of balance sheet entries 826-1 of an account may be entered and/or listed. In some embodiments, the balance sheet tab 826 may comprise an area where net worth 828 may be entered, calculated (e.g., based on the balance sheet entries 826-1), and/or output, as depicted.

According to some embodiments the interface 800 may also or alternatively comprise one or more other tabs such as a credit analysis tab 830, an indemnity tab 840, and/or a program and credit extension tab 850. These other tabs 830, 840, 850 may, for example, include areas for entry of other account, customer, and/or surety business information (e.g., customer data 1292 and/or surety business data 1294 as described with respect to FIG. 12 herein). In some embodiments, all desired information may be aggregated and/or otherwise processed (e.g., in accordance with the method 200 of FIG. 2 and/or in accordance with any of the processes 300, 400, 500 of FIG. 3, FIG. 4, and/or FIG. 5 herein) and may be presented on the program and credit extension tab 850, for example, to provide a recommended surety quote metric (e.g., at 214 of the method 200 of FIG. 2)—e.g., for each of a plurality of desired and/or applicable surety bond risk buckets as described herein.

Figure 9:
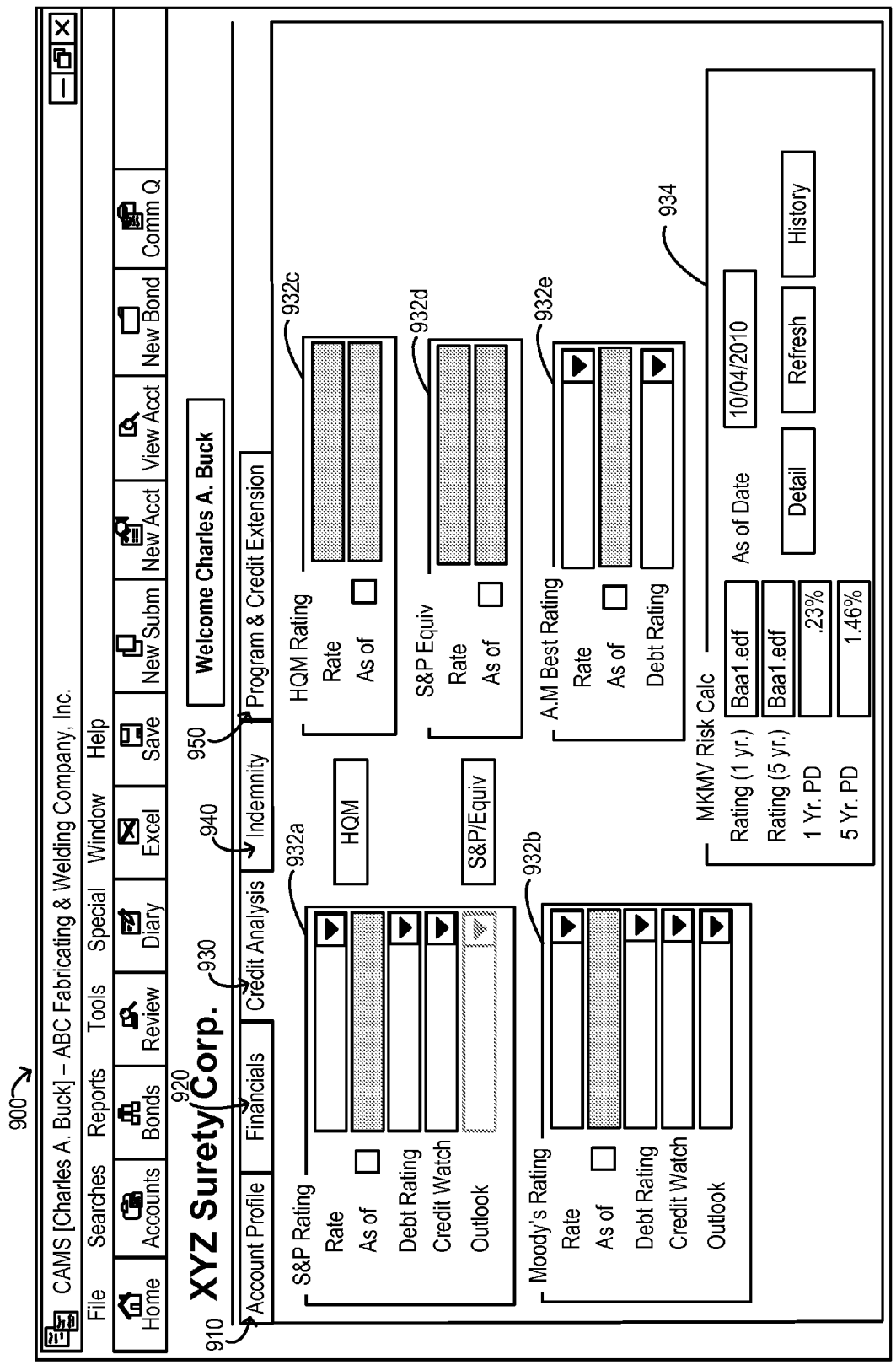
FIG. 9 is an example interface according to some embodiments.

Turning now to FIG. 9, an exemplary interface 900 according to some embodiments is shown. In some embodiments, the interface 900 may comprise a web page, web form, database entry form, Application Program Interface (API), spreadsheet, table, and/or application or other Graphical User Interface (GUI) via which an underwriter (or other entity) may enter data to conduct and/or facilitate a surety underwriting and/or sales process. The interface 900 may, for example, comprise a front-end of a surety underwriting program and/or platform programmed and/or otherwise configured to execute, conduct, and/or facilitate any of the various processes 300, 400, 500 of FIG. 3, FIG. 4, and/or FIG. 5 and/or the method 200 of FIG. 2, and/or portions or combinations thereof. In some embodiments, the interface 900 may be output via a computerized device such as the computerized processing device 120 of FIG. 1. According to some embodiments, the interface 900 may be similar in configuration and/or functionality to the interfaces 600, 700, 800 described in conjunction with FIG. 6, FIG. 7, and/or FIG. 8 herein. Components of the interface 900 may, for example, be similar in configuration and/or functionality to any similarly-named and/or numbered components of the interfaces 600, 700, 800.

According to some embodiments, the interface 900 may comprise one or more tabs and/or other segmented and/or logical-presented data forms such as an account profile tab 910, a financials tab 920, and/or a credit analysis tab 930. In some embodiments, the credit analysis tab 930 may be configured and/or organized to allow and/or facilitate entry of data regarding credit rating information of a surety account (and/or potential surety account). As depicted, for example, the credit analysis tab 930 may comprise one or more areas (e.g., one or more data entry mechanisms, tools, objects, and/or features) such that information descriptive of one or more credit ratings 932a-e of an account may be entered and/or listed. In some embodiments, the credit analysis tab 930 may comprise an area where credit rating metrics 934 may be entered, calculated (e.g., based on the credit ratings 932a-e), and/or output, as depicted.

According to some embodiments the interface 900 may also or alternatively comprise one or more other tabs such as an indemnity tab 940, and/or a program and credit extension tab 950. These other tabs 940, 950 may, for example, include areas for entry of other account, customer, and/or surety business information (e.g., customer data 1292 and/or surety business data 1294 as described with respect to FIG. 12 herein). In some embodiments, all desired information may be aggregated and/or otherwise processed (e.g., in accordance with the method 200 of FIG. 2 and/or in accordance with any of the processes 300, 400, 500 of FIG. 3, FIG. 4, and/or FIG. 5 herein) and may be presented on the program and credit extension tab 950, for example, to provide a recommended surety quote metric (e.g., at 214 of the method 200 of FIG. 2)—e.g., for each of a plurality of desired and/or applicable surety bond risk buckets as described herein.

Figure 10:
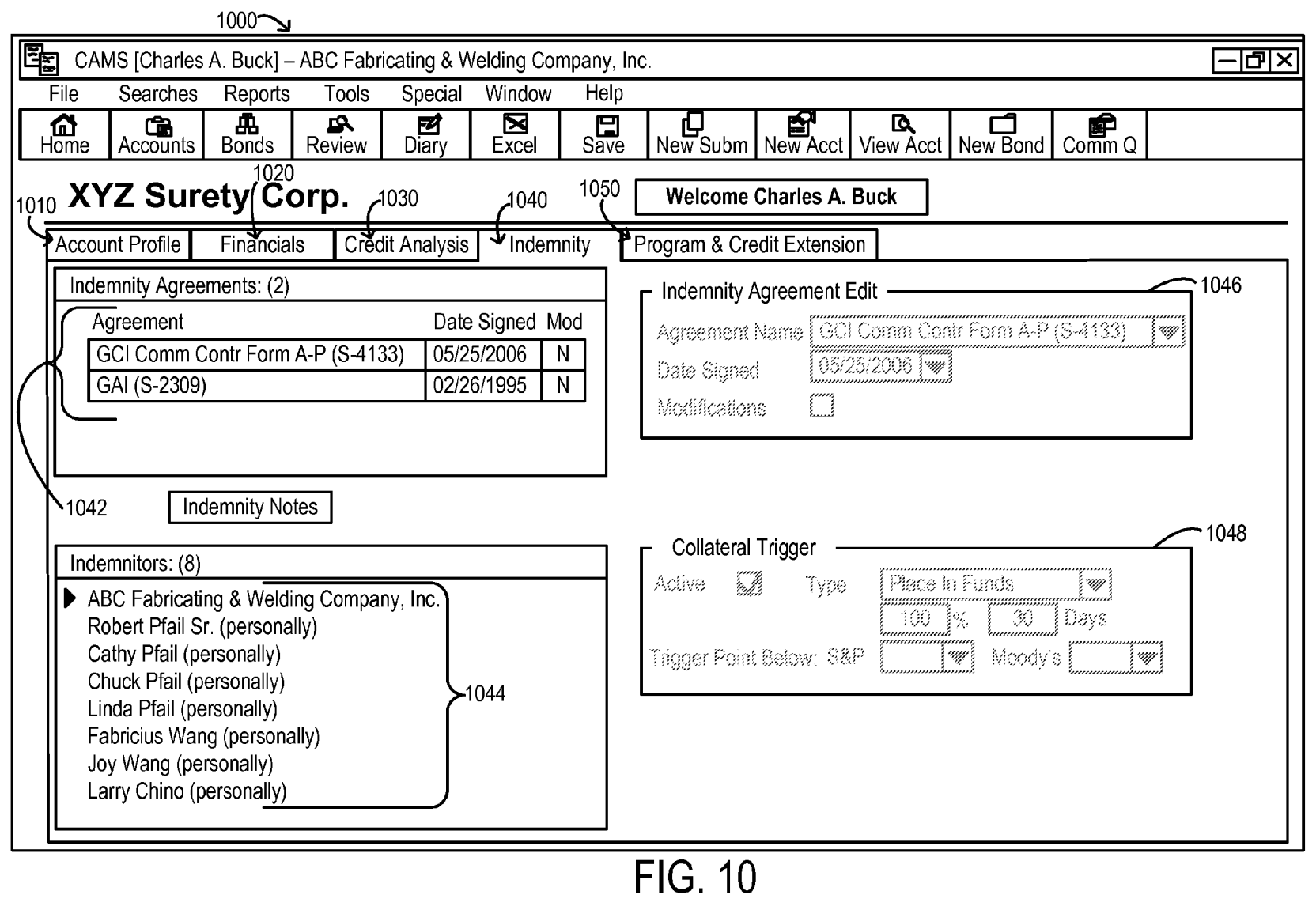

Turning now to FIG. 10, an exemplary interface 1000 according to some embodiments is shown. In some embodiments, the interface 1000 may comprise a web page, web form, database entry form, Application Program Interface (API), spreadsheet, table, and/or application or other Graphical User Interface (GUI) via which an underwriter (or other entity) may enter data to conduct and/or facilitate a surety underwriting and/or sales process. The interface 1000 may, for example, comprise a front-end of a surety underwriting program and/or platform programmed and/or otherwise configured to execute, conduct, and/or facilitate any of the various processes 300, 400, 500 of FIG. 3, FIG. 4, and/or FIG. 5 and/or the method 200 of FIG. 2, and/or portions or combinations thereof. In some embodiments, the interface 1000 may be output via a computerized device such as the computerized processing device 120 of FIG. 1. According to some embodiments, the interface 1000 may be similar in configuration and/or functionality to the interfaces 600, 700, 800, 900 described in conjunction with FIG. 6, FIG. 7, FIG. 8, and/or FIG. 9 herein. Components of the interface 1000 may, for example, be similar in configuration and/or functionality to any similarly-named and/or numbered components of the interfaces 600, 700, 800, 900.

According to some embodiments, the interface 1000 may comprise one or more tabs and/or other segmented and/or logical-presented data forms such as an account profile tab 1010, a financials tab 1020, a credit analysis tab 1030, and/or an indemnity tab 1040. In some embodiments, the indemnity tab 1040 may be configured and/or organized to allow and/or facilitate entry of data regarding indemnity information of a surety account (and/or potential surety account). As depicted, for example, the indemnity tab 1040 may comprise one or more areas (e.g., one or more data entry mechanisms, tools, objects, and/or features) such that information descriptive of indemnity agreement data 1042, indemnitors data 1044, indemnity modification data 1046, and/or collateral trigger data 1048 of an account may be entered and/or listed.

According to some embodiments the interface 1000 may also or alternatively comprise one or more other tabs such as a program and credit extension tab 1050. Such other tabs 1050 may, for example, include areas for entry of other account, customer, and/or surety business information (e.g., customer data 1292 and/or surety business data 1294 as described with respect to FIG. 12 herein). In some embodiments, all desired information may be aggregated and/or otherwise processed (e.g., in accordance with the method 200 of FIG. 2 and/or in accordance with any of the processes 300, 400, 500 of FIG. 3, FIG. 4, and/or FIG. 5 herein) and may be presented on the program and credit extension tab 1050, for example, to provide a recommended surety quote metric (e.g., at 214 of the method 200 of FIG. 2)—e.g., for each of a plurality of desired and/or applicable surety bond risk buckets as described herein.

Turning now to FIG. 11, an exemplary interface 1100 according to some embodiments is shown. In some embodiments, the interface 1100 may comprise a web page, web form, database entry form, Application Program Interface (API), spreadsheet, table, and/or application or other Graphical User Interface (GUI) via which an underwriter (or other entity) may enter data to conduct and/or facilitate a surety underwriting and/or sales process. The interface 1100 may, for example, comprise a front-end of a surety underwriting program and/or platform programmed and/or otherwise configured to execute, conduct, and/or facilitate any of the various processes 300, 400, 500 of FIG. 3, FIG. 4, and/or FIG. 5 and/or the method 200 of FIG. 2, and/or portions or combinations thereof. In some embodiments, the interface 1100 may be output via a computerized device such as the computerized processing device 120 of FIG. 1. According to some embodiments, the interface 1100 may be similar in configuration and/or functionality to the interfaces 600, 700, 800, 900, 1000 described in conjunction with FIG. 6, FIG. 7, FIG. 8, FIG. 9, and/or FIG. 10 herein. Components of the interface 1100 may, for example, be similar in configuration and/or functionality to any similarly-named and/or numbered components of the interfaces 600, 700, 800, 900, 1000.

According to some embodiments, the interface 1100 may comprise one or more tabs and/or other segmented and/or logical-presented data forms such as an account profile tab 1110. In some embodiments, the program and credit extension tab 1150 may be configured and/or organized to pull information descriptive of a surety account (and/or potential surety account) from one or more other tabs such as the account profile tab 1110. The program and credit extension tab 1150 may also or alternatively comprise one or more areas for entry of other account, customer, and/or surety business information (e.g., customer data 1292 and/or surety business data 1294 as described with respect to FIG. 12 herein).

As depicted, for example, the program and credit extension tab 1150 may comprise one or more areas (e.g., one or more data entry mechanisms, tools, objects, and/or features) such that information descriptive of collateral data 1112 of an account may be displayed, provided, entered and/or listed. The collateral data 1112 may, for example, be pulled and/or referenced from the account profile tab 1110 (and/or from a database storing information related thereto). In some embodiments, the program and credit extension tab 1150 may comprise one or more areas such that information descriptive of account exposure data 1114 may be displayed, provided, entered and/or listed. The account exposure data 1114 may, for example, be pulled and/or referenced from the account profile tab 1110 (and/or from a database storing information related thereto). According to some embodiments, the account exposure data 1114 may include data for each of a plurality of surety product type buckets 1114*a*-*k*. In some embodiments, an aggregate of actual account exposure metric 1116 may be provided, calculated, entered, and/or modified.

According to some embodiments, the interface 1100 may comprise one or more tabs and/or other segmented and/or logical-presented data forms such as a financials tab 1120. In some embodiments, the program and credit extension tab 1150 may be configured and/or organized to pull information descriptive of a surety account (and/or potential surety account) from one or more other tabs such as the financials tab 1120. As depicted, for example, the program and credit extension tab 1150 may comprise one or more areas (e.g., one or more data entry mechanisms, tools, objects, and/or features) such that information descriptive of financial statement quality data 1124 of an account may be displayed, provided, entered and/or listed. The financial statement quality data 1124 may, for example, be pulled and/or referenced from the financials tab 1120 (and/or from a database storing information related thereto). In some embodiments, the program and credit extension tab 1150 may comprise one or more areas such that information descriptive of net worth data 1128 may be displayed, provided, entered and/or listed. The net worth data 1128 may, for example, be pulled and/or referenced from the financials tab 1120 (and/or from a database storing information related thereto).

In some embodiments, the interface 1100 may comprise one or more tabs and/or other segmented and/or logical-presented data forms such as a credit analysis tab 1130. In some embodiments, the program and credit extension tab 1150 may be configured and/or organized to pull information descriptive of a surety account (and/or potential surety account) from one or more other tabs such as the credit analysis tab 1130. As depicted, for example, the program and credit extension tab 1150 may comprise one or more areas (e.g., one or more data entry mechanisms, tools, objects, and/or features) such that information descriptive of credit rating data 1134 of an account may be displayed, provided, entered and/or listed. The credit rating data 1134 may, for example, be pulled and/or referenced from the credit analysis tab 1130 (and/or from a database storing information related thereto).

According to some embodiments, the interface 1100 may comprise one or more tabs and/or other segmented and/or logical-presented data forms such as an indemnity tab 1140. In some embodiments, the program and credit extension tab 1150 may be configured and/or organized to pull information descriptive of a surety account (and/or potential surety account) from one or more other tabs such as the indemnity tab 1140. As depicted, for example, the program and credit extension tab 1150 may comprise one or more areas (e.g., one or more data entry mechanisms, tools, objects, and/or features) such that information descriptive of indemnity data 1142 of an account may be displayed, provided, entered and/or listed. The indemnity data 1142 may, for example, be pulled and/or referenced from the indemnity tab 1140 (and/or from a database storing information related thereto)—e.g., the indemnity agreement data 1042, indemnitors data 1044, indemnity modification data 1046, and/or collateral trigger data 1048 of the interface 1000 of FIG. 10 herein.

In some embodiments, the interface 1100 may be utilized to underwrite, quote, and/or sell surety products. According to some embodiments, the interface 1100 may also or alternatively be utilized to model surety scenarios. The interface 1110 (and/or the program and credit extension tab 1150) may comprise, for example, a modeling indicator 1152, such as the radio-button object shown, that permits a user (e.g., an underwriter) to choose a modeling mode for the interface 1100 (and/or to switch between the modeling mode and a regular and/or underwriting mode).

According to some embodiments, the interface 1100 (and/or the program and credit extension tab 1150) may comprise a plurality of underwriter modification data entry objects 1154. The underwriter modification data entry objects 1154 may, for example, permit an underwriter some guided and/or bounded flexibility to affect the operation of the interface 1100 (and/or underlying program or application thereof). In some embodiments, the underwriter modification data entry objects 1154 may correspond to various underwriter modifications such as those described with reference to the process 500 of FIG. 5 herein. As depicted in FIG. 11, some information that may be pulled and/or referenced from other tabs 1110, 1120, 1130, 1140 may be included as an underwriter modification data entry object 1154. Underwriter modification data entry objects 1154 may also or alternatively occur only on the program and credit extension tab 1150, as is or becomes practicable and/or desirable.

In some embodiments, the interface 1100 (and/or the program and credit extension tab 1150) may comprise a comment box 1156. The comment box 1156 may, for example, comprise a data entry object where an underwriter may provide descriptions and/or other narrative regarding data and/or selections associated any or all of the underwriter modification data entry objects 1154. In FIG. 11, for example, the comment box 1156 includes text describing why the underwriter modification data entry object 1154 labeled "Transparency" has been set for a modifier of "10% Debit". According to some embodiments, the interface 1100 may display, present, and/or otherwise provide results of a surety underwriting program or application such by displaying a recommended surety quote metric 1158.

The recommended surety quote metric 1158 may, in some embodiments, be determined based on calculations taking into account any or all of the various data presented and/or input via the interface 1100. The recommended surety quote metric 1158 may, for example, be calculated and/or determined in accordance with any of the various processes 300, 400, 500 of FIG. 3, FIG. 4, and/or FIG. 5 and/or the method 200 of FIG. 2. In some embodiments, the interface 1100 (and/or the program and credit extension tab 1150) may comprise an approved program quote metric 1160. The approved program quote metric 1160 may, for example, comprise a difference between the recommended surety quote metric 1158 (e.g., a benchmark capacity) and the actual account exposure metric 1116. In some embodiments, the approved program quote metric 1160 may represent an amount of credit that an underwriter is approved to offer to a customer.

While various components of the interfaces 600, 700, 800, 900, 1000, 1100 of FIG. 6, FIG. 7, FIG. 8, FIG. 9, FIG. 10, and FIG. 11 have been described with respect to certain labels, layouts, headings, titles, and/or configurations, these features have been presented for reference and example only. Other labels, layouts, headings, titles, and/or configurations may be implemented without deviating from the scope of embodiments herein. Similarly, while a certain number of tabs, information screens, form fields, and/or data entry options have been presented, variations thereof may be practiced in accordance with some embodiments.

V. Apparatus

Figure 12:
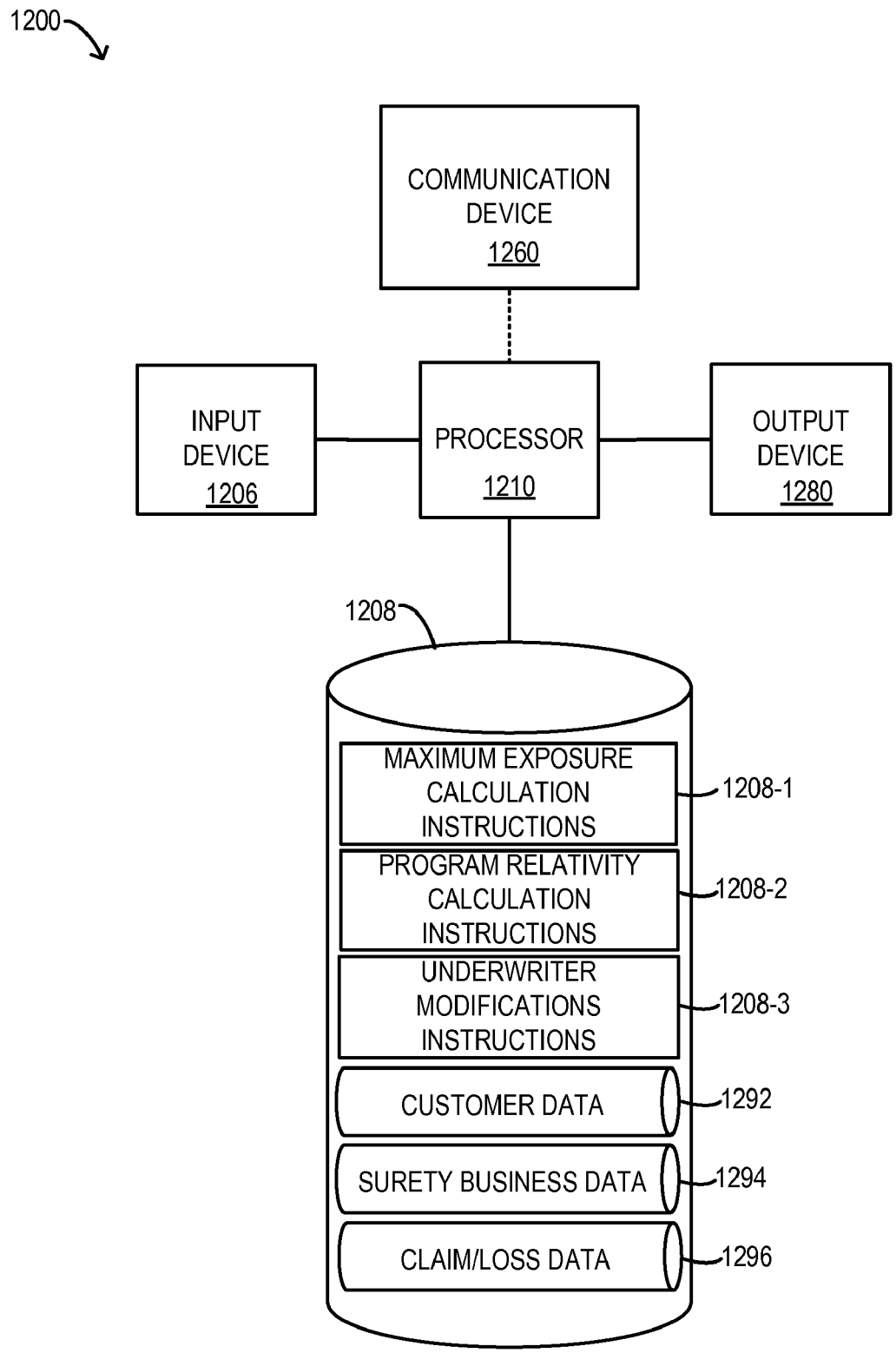
FIG. 12 is an apparatus according to some embodiments.

Turning to FIG. 12, a block diagram of an apparatus 1200 according to some embodiments is shown. In some embodiments, the apparatus 1200 may be similar in configuration and/or functionality to the computerized processing device 120 of FIG. 1 herein. The apparatus 1200 may, for example, execute, process, facilitate, and/or otherwise be associated with the method 200 of FIG. 2 and/or with any of the processes 300, 400, 500 of FIG. 3, FIG. 4, and/or FIG. 5 herein. In some embodiments, the apparatus 1200 may comprise an input device 1206, a memory device 1208, an electronic processor 1210, a communication device 1260, and/or an output device 1280. Fewer or more components and/or various configurations of the components 1206, 1208, 1210, 1260, 1280 may be included in the system 1200 without deviating from the scope of embodiments described herein.

According to some embodiments, the electronic processor 1210 may be or include any type, quantity, and/or configuration of electronic and/or computerized processor that is or becomes known. The electronic processor 1210 may comprise, for example, an Intel® IXP 2800 network processor or an Intel® XEON™ Processor coupled with an Intel® E7501 chipset. In some embodiments, the electronic processor 1210 may comprise multiple inter-connected processors, microprocessors, and/or micro-engines. According to some embodiments, the processor 1210 (and/or the apparatus 1200 and/or other components thereof) may be supplied power via a power supply (not shown) such as a battery, an Alternating Current (AC) source, a Direct Current (DC) source, an AC/DC adapter, solar cells, and/or an inertial generator. In the case that the apparatus 1200 comprises a server such as a blade server, necessary power may be supplied via a standard AC outlet, power strip, surge protector, and/or Uninterruptible Power Supply (UPS) device.

In some embodiments, the input device 1206 and/or the output device 1280 are communicatively coupled to the electronic processor 1210 (e.g., via wired and/or wireless connections, traces, and/or pathways) and they may generally comprise any types or configurations of input and output components and/or devices that are or become known, respectively. The input device 1206 may comprise, for example, a keyboard that allows an operator of the apparatus 1200 to interface with the apparatus 1200 (e.g., by a surety underwriter, such as to implement and/or interact with embodiments herein to underwrite, quote, and/or sell surety products). The output device 1280 may, according to some embodiments, comprise a display screen and/or other practicable output component and/or device. The output device 1280 may, for example, provide surety product underwriting guidance, benchmarks, and/or quotes (e.g., via a website and/or via a computer workstation). According to some embodiments, the input device 1206 and/or the output device 1280 may comprise and/or be embodied in a single device such as a touch-screen monitor.

In some embodiments, the communication device 1260 may comprise any type or configuration of communication device that is or becomes known or practicable. The communication device 1260 may, for example, comprise a network interface card (NIC), a telephonic device, a cellular network device, a router, a hub, a modem, and/or a communications port or cable. In some embodiments, the communication device 1260 may be coupled to provide data to a customer device, such as in the case that the apparatus 1200 is utilized to provide surety product quotations and/or sales. According to some embodiments, the communication device 1260 may also or alternatively be coupled to the electronic processor 1210. In some embodiments, the communication device 1260 may comprise an IR, RF, Bluetooth™, and/or Wi-Fi® network device coupled to facilitate communications between the electronic processor 1210 and another device (such as a customer device and/or a third-party device).

The memory device 1208 may comprise any appropriate information storage device that is or becomes known or available, including, but not limited to, units and/or combinations of magnetic storage devices (e.g., a hard disk drive), optical storage devices, and/or semiconductor memory devices such as Random Access Memory (RAM) devices, Read Only Memory (ROM) devices, Single Data Rate Random Access Memory (SDR-RAM), Double Data Rate Random Access Memory (DDR-RAM), and/or Programmable Read Only Memory (PROM). The memory device 1208 may, according to some embodiments, store one or more of maximum exposure calculation instructions 1208-1, program relativity calculation instructions 1280-2, and/or underwriter modifications instructions 1208-3. In some embodiments, the calculation instructions 1208-1, program relativity calculation instructions 1280-2, and/or underwriter modifications instructions 1208-3 may be utilized by the electronic processor 1210 to provide output information via the output device 1280 and/or the communication device 1260 (e.g., the recommended surety quote metric at 210 of the method 200 of FIG. 2).

According to some embodiments, the maximum exposure calculation instructions 1208-1 may be operable to cause the electronic processor 1210 to access and/or process customer data 1292 and/or surety business data 1294, as described herein (e.g., in accordance with the process 300 of FIG. 3 herein). Customer data 1292 and/or surety business data 1294 received via the input device 1206 and/or the communication device 1260 may, for example, be analyzed, sorted, filtered, decoded, decompressed, ranked, scored, plotted, and/or otherwise processed by the electronic processor 1210 in accordance with the maximum exposure calculation instructions 1208-1. In some embodiments, customer data 1292 and/or surety business data 1294 may be fed by the electronic processor 1210 through one or more mathematical and/or statistical formulas and/or models in accordance with the maximum exposure calculation instructions 1208-1 to define one or more maximum exposure metrics that may then be utilized to facilitate surety product underwriting as described herein.

In some embodiments, the program relativity calculation instructions 1280-2 may be operable to cause the electronic processor 1210 to access and/or process customer data 1292 and/or surety business data 1294, as described herein (e.g., in accordance with the process 400 of FIG. 4 herein). Customer data 1292 and/or surety business data 1294 received via the input device 1206 and/or the communication device 1260 may, for example, be analyzed, sorted, filtered, decoded, decompressed, ranked, scored, plotted, and/or otherwise processed by the electronic processor 1210 in accordance with the program relativity calculation instructions 1280-2. In some embodiments, customer data 1292 and/or surety business data 1294 may be fed by the electronic processor 1210 through one or more mathematical and/or statistical formulas and/or models in accordance with the program relativity calculation instructions 1280-2 to define one or more program relativity metrics that may then be utilized to facilitate surety product underwriting as described herein.

According to some embodiments, the underwriter modifications instructions 1208-3 may be operable to cause the electronic processor 1210 to access and/or process customer data 1292 and/or surety business data 1294 (e.g., data entered and/or selected or otherwise identified by an underwriter), as described herein (e.g., in accordance with the process 500 of FIG. 5 herein). Customer data 1292 and/or surety business data 1294 received via the input device 1206 and/or the communication device 1260 may, for example, be analyzed, sorted, filtered, decoded, decompressed, ranked, scored, plotted, and/or otherwise processed by the electronic processor 1210 in accordance with the underwriter modifications instructions 1208-3. In some embodiments, customer data 1292 and/or surety business data 1294 may be fed by the electronic processor 1210 through one or more mathematical and/or statistical formulas and/or models in accordance with the underwriter modifications instructions 1208-3 to define and/or modify on or more recommended surety quote metrics that may then be utilized to facilitate surety product underwriting as described herein.

In some embodiments, the memory device 1208 may also/or alternatively store claim/loss data 1296. The claim/loss data 1296 may, for example, comprise data obtained from determining loss information (e.g., at 218 of the method 200 of FIG. 2 herein) such as may be based on one or more loss and/or default events associated with a customer and/or surety product. As described in conjunction with 220*a-b* of the method 200 of FIG. 2 herein, the claim/loss data 1296 may be utilized to update, modify, and/or otherwise influence or affect the various calculations and/or processes described herein. The input device 1206 and/or the communication device 1260 may receive the claim/loss data 1296, which may be stored (as depicted in FIG. 12) by the memory device 1208 and/or which may be processed by the electronic processor 1210 in accordance with stored instructions (not explicitly shown in FIG. 12), such as to modify one or more of the maximum exposure calculation instructions 1208-1, program relativity calculation instructions 1280-2, and/or underwriter modifications instructions 1208-3.

According to some embodiments, the apparatus 1200 may generally function as a computer terminal and/or server of an insurance and/or surety underwriting company, for example, which is utilized to process surety applications. In some embodiments, the apparatus 1200 may comprise a web server and/or other portal (e.g., an IVRU) that provides surety information to customers and/or third-parties.

Any or all of the exemplary instructions and data types described herein and other practicable types of data may be stored in any number, type, and/or configuration of memory devices that is or becomes known. The memory device 1208 may, for example, comprise one or more data tables or files, databases, table spaces, registers, and/or other storage structures. In some embodiments, multiple databases and/or storage structures (and/or multiple memory devices 1208) may be utilized to store information associated with the apparatus 1200. According to some embodiments, the memory device 1208 may be incorporated into and/or otherwise coupled to the apparatus 1200 (e.g., as shown) or may simply be accessible to the apparatus 1200 (e.g., externally located and/or situated).

VI. Articles of Manufacture

Figure 13A:
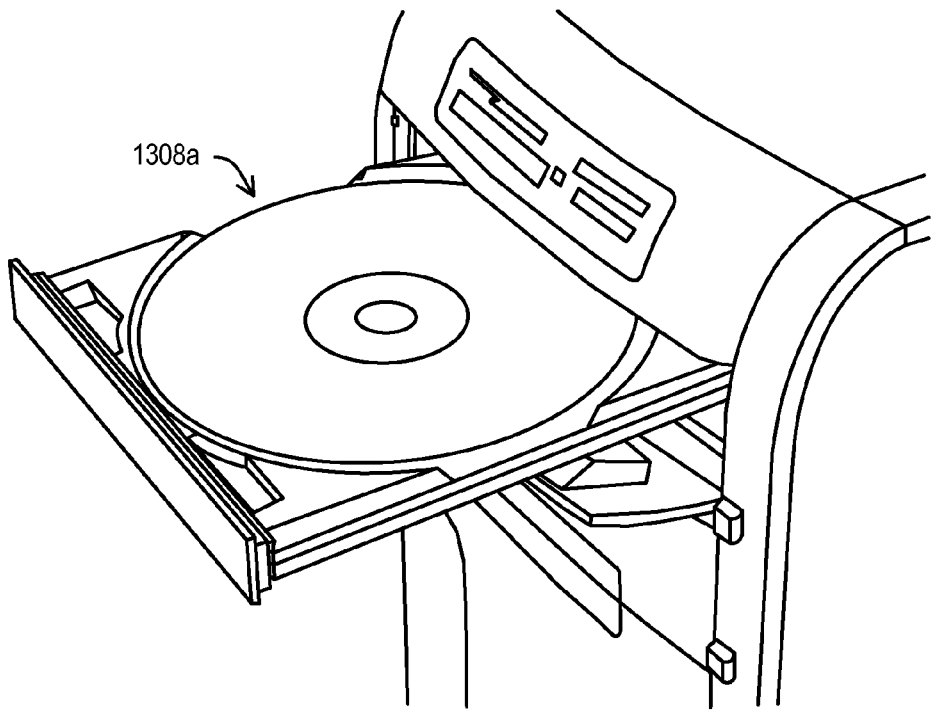
FIG. 13A and FIG. 13B are perspective diagrams of exemplary data storage devices according to some embodiments.
Figure 13B:
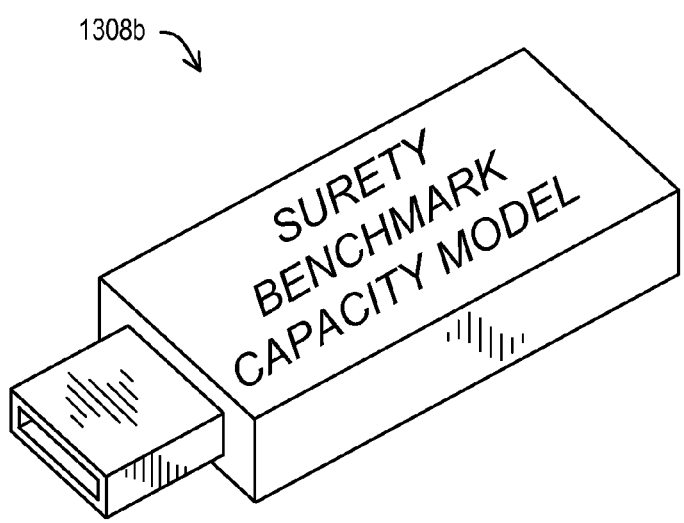

Referring to FIG. 13A and FIG. 13B, perspective diagrams of exemplary data storage devices 1308*a-b* according to some embodiments are shown. The data storage devices 1308-*a-b* may, for example, be utilized to store instructions and/or data such as the maximum exposure calculation instructions 1208-1, program relativity calculation instructions 1280-2, and/or underwriter modifications instructions 1208-3, each of which is described in reference to FIG. 12 herein. In some embodiments, instructions stored on the data storage devices 1308*a-b* may, when executed by a processor (such as the electronic processor 1210 of FIG. 12), cause the implementation of and/or facilitate any of the various processes 300, 400, 500 of FIG. 3, FIG. 4, and/or FIG. 5 and/or the method 200 of FIG. 2, described herein. The data storage devices 1208-a-b may also or alternatively store data such as the customer data 1292, the surety business data 1294, and/or the claim/loss data 1296, all as described with reference to FIG. 12 herein.

According to some embodiments, the first data storage device 1208a may comprise a CD, CD-ROM, DVD, Blu-Ray™ Disc, and/or other type of optically-encoded disk and/or other computer-readable storage medium that is or becomes know or practicable. In some embodiments, the second data storage device 1208b may comprise a USB key-fob, dongle, and/or other type of flash memory data storage device that is or becomes know or practicable. The data storage devices 1208-a-b may generally store program instructions, code, and/or modules that, when executed by an electronic and/or computerized processing device cause a particular machine to function in accordance with embodiments described herein. In some embodiments, the data storage devices 1208-a-b depicted in FIG. 13A and FIG. 13B are representative of a class and/or subset of computer-readable media that are defined herein as "computer-readable memory" (e.g., memory devices as opposed to transmission devices). While computer-readable media may include transitory media types, as utilized herein, the term computer-readable memory is limited to non-transitory computer-readable media.

VII. Other Embodiments

Figure 14:
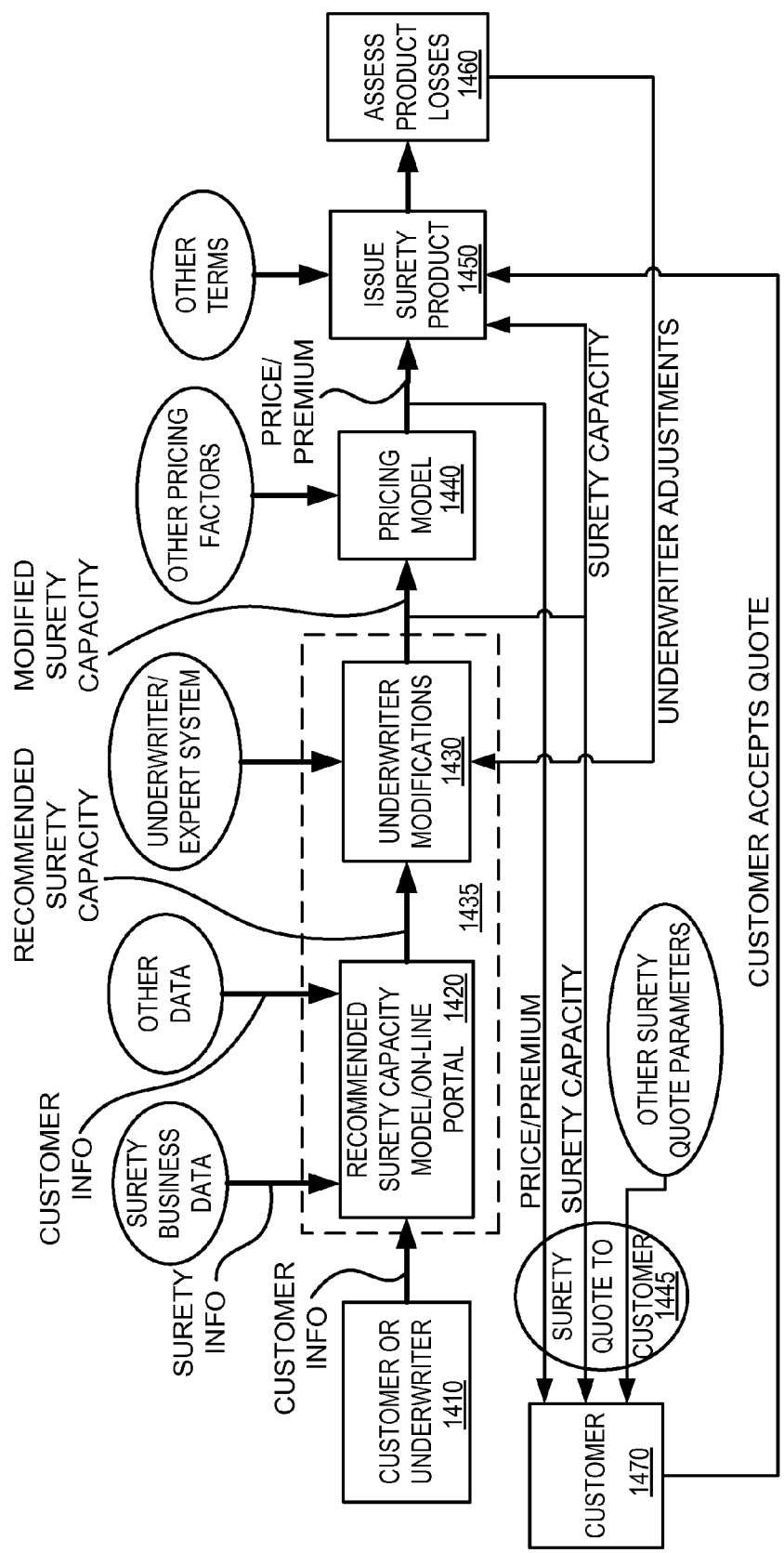
FIG. 14 is a flow diagram of a method according to some embodiments.

Referring to FIG. 14, a customer or underwriter (or other surety-related person) 1410 enters the customer information (described herein) into a recommended surety capacity model 1420, which may be accessed by an on-line portal. The capacity model 1420 may be analogous to the blocks 204, 208, 210 in FIG. 2 herein. Any other data about the customer, such as financial/credit information and other information needed, as discussed herein, may be provided to the model 1420. Also, data describing the business of the surety entity (i.e., the surety business), may be provided to the capacity model 1420 as described herein with regard to FIG. 2. The capacity model 1420 calculates the recommended surety capacity amount (or metric) as described herein, which amount may be modified by the underwriting modifications logic 1430, as described herein with regard to FIG. 5. Such modifications may be based on input from an underwriter (or other surety-related person) or from an expert system, such as a computer-based system, as described herein. The recommended surety capacity model 1420 and underwriting modifications logic 1430 may be referred to collectively as a surety capacity model 1435.

The modified surety capacity amount (or metric) may be provided to the customer 1470 as part of a quote 1445 and may also be provided to a pricing model 1440 for determining the premium (or price) for the surety product. Other factors, in addition to the capacity amount, such as the data describing the surety business, and other risk, service, and pricing factors (as is known) determine the price. If the customer 1470 accepts the quote (including the other surety quote parameters as described herein), the surety product is issued at 1450 to the customer 1470 and it becomes effective based on its terms, which may include the price, the surety capacity, and the other surety quote parameters, and any other relevant terms. The losses associated with the surety product may be assessed at a box 1460 based on determining loss information as described in block 218 of FIG. 2, and may provide adjustments to the underwriting modifications logic 1430, as described herein.

VIII. Rules of Interpretation

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments of the invention nor a listing of features of the invention that must be present in all embodiments.

Neither the Title (set forth at the beginning of the first page of this patent application) nor the Abstract (set forth at the end of this patent application) is to be taken as limiting in any way the scope of the disclosed invention(s).

The term "product" means any machine, manufacture and/or composition of matter as contemplated by 35 U.S.C. §101, unless expressly specified otherwise.

The terms "an embodiment", "embodiment", "embodiments", "the embodiment", "the embodiments", "one or more embodiments", "some embodiments", "one embodiment" and the like mean "one or more (but not all) disclosed embodiments", unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present application, including the specification, its claims and figures, and anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase at least one of a widget, a car and a wheel means (i) a widget, (ii) a car, (iii) a wheel, (iv) a widget and a car, (v) a widget and a wheel, (vi) a car and a wheel, or (vii) a widget, a car and a wheel.

The phrase "based on" does not mean "based only on", unless expressly specified otherwise. In other words, the phrase "based on" describes both "based only on" and "based at least on".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restrict the meaning or scope of the claim.

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to allow for distinguishing that particular referenced feature from another feature that is described by the same term or by a similar term. For example, a "first widget" may be so named merely to allow for distinguishing it in one or more claims from a "second widget", so as to encompass embodiments in which (1) the "first widget" is or is the same as the "second widget" and (2) the "first widget" is different than or is not identical to the "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; (3) does not indicate that either widget ranks above or below any other, as in importance or quality; and (4) does not indicate that the two referenced widgets are not identical or the same widget. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device or article is described herein, more than one device or article (whether or not they cooperate) may alternatively be used in place of the single device or article that is described. Accordingly, the functionality that is described as being possessed by a device may alternatively be possessed by more than one device or article (whether or not they cooperate).

Similarly, where more than one device or article is described herein (whether or not they cooperate), a single device or article may alternatively be used in place of the more than one device or article that is described. For example, a plurality of computer-based devices may be substituted with a single computer-based device. Accordingly, the various functionality that is described as being possessed by more than one device or article may alternatively be possessed by a single device or article.

The functionality and/or the features of a single device that is described may be alternatively embodied by one or more other devices which are described but are not explicitly described as having such functionality and/or features. Thus, other embodiments need not include the described device itself, but rather can include the one or more other devices which would, in those other embodiments, have such functionality/features.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not indicate that all or even any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Headings of sections provided in this patent application and the title of this patent application are for convenience only, and are not to be taken as limiting the disclosure in any way.

"Determining" something can be performed in a variety of manners and therefore the term "determining" (and like terms) includes calculating, computing, deriving, looking up (e.g., in a table, database or data structure), ascertaining and the like.

It will be readily apparent that the various methods and algorithms described herein may be implemented by, e.g., appropriately and/or specially-programmed general purpose computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software A "processor" generally means any one or more microprocessors, CPU devices, computing devices, microcontrollers, digital signal processors, or like devices, as further described herein.

The term "computer-readable medium" refers to any medium that participates in providing data (e.g., instructions or other information) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

The term "computer-readable memory" may generally refer to a subset and/or class of computer-readable medium that does not include transmission media such as waveforms, carrier waves, electromagnetic emissions, etc. Computer-readable memory may typically include physical media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, computer hard drives, backup tapes, Universal Serial Bus (USB) memory devices, and the like.

Various forms of computer readable media may be involved in carrying data, including sequences of instructions, to a processor. For example, sequences of instruction (i) may be delivered from RAM to a processor, (ii) may be carried over a wireless transmission medium, and/or (iii) may be formatted according to numerous formats, standards or protocols, such as Bluetooth™, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The present invention can be configured to work in a network environment including a computer that is in communication, via a communications network, with one or more devices. The computer may communicate with the devices directly or indirectly, via a wired or wireless medium such as the Internet, LAN, WAN or Ethernet, Token Ring, or via any appropriate communications means or combination of communications means. Each of the devices may comprise computers, such as those based on the Intel® Pentium® or Centrino™ processor, that are adapted to communicate with the computer. Any number and type of machines may be in communication with the computer.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

What is claimed is:

1. A method, comprising:
  receiving, by a specially-programmed computerized processing device, information descriptive of (i) a net worth of a potential surety customer and (ii) a credit rating of the potential surety customer;
  calculating, by the specially-programmed computerized processing device, (i) a size scaling factor based on the net worth of the potential surety customer and (ii) a credit rating scaling factor, by dividing a credit rating scaling factor constant by a benchmark default probability that corresponds to the credit rating of the potential surety customer;
  calculating, by the specially-programmed computerized processing device, a program relativity metric for each of a plurality of surety bond type buckets, by multiplying the size scaling factor, the credit rating scaling factor, and a bond obligation type scaling factor that corresponds to each of the plurality of surety bond type buckets;
  selecting, by the specially-programmed computerized processing device, one of a set of maximum exposure matrices based on at least one of (i) the net worth of the potential surety customer and (ii) the credit rating of the potential surety customer;
  determining, by the specially-programmed computerized processing device, based on the credit rating of the potential surety customer and based on the selected one of the set of maximum exposure matrices, a maximum exposure metric for each of the plurality of surety bond type buckets; and outputting, by the specially-programmed computerized processing device, a recommended surety quote metric for each of the plurality of surety bond type buckets, by outputting the lesser of the calculated program relativity metric and the maximum exposure metric for each of the plurality of surety bond type buckets.

2. The method of claim 1, further comprising:
providing, by the specially-programmed computerized processing device, a menu option for each of a plurality of underwriter modification metrics;
receiving, by the specially-programmed computerized processing device, input via at least one of the menu options for the plurality of underwriter modification metrics; and
modifying, by the specially-programmed computerized processing device, based on the input received via the at least one of the menu options for the plurality of underwriter modification metrics, the recommended surety quote metric for at least one of the plurality of surety bond type buckets.

3. The method of claim 2, further comprising:
receiving an indication of loss data associated with a surety product for which the surety quote metric is output; and
modifying, based on the loss data, the menu options for each of the plurality of underwriter modification metrics.

4. The method of claim 1, wherein the set of maximum exposure matrices comprises a set of four matrices.

5. The method of claim 1, wherein the plurality of surety bond type buckets comprises eight surety bond type buckets.

6. The method of claim 1, further comprising:
receiving an indication of loss data associated with a surety product for which the surety quote metric is output; and
modifying, based on the loss data, how one or more of the calculating processes are conducted regarding output of future surety quote metrics.

7. The method of claim 1, further comprising:
receiving, by the specially-programmed computerized processing device, a request to modify the recommended surety quote metric based on an aspect of a potential transaction between a surety business and the potential surety customer.

8. The method of claim 7, wherein the aspect is chosen from credit issues, indemnity issues, underwriting issues, transparency issues, contract risk, financial statement quality issues, and industry classification issues.

9. The method of claim 7, further comprising:
receiving, by the specially-programmed computerized processing device, a modifier;
calculating, by the specially-programmed computerized processing device, a modified surety quote metric for each of the plurality of surety bond type buckets; and
outputting, by the specially-programmed computerized processing device, the modified surety quote metric for each of the plurality of surety bond type buckets.

10. The method of claim 9, wherein the modifier is selected from a set of predetermined modifiers.

11. The method of claim 7, further comprising:
calculating, by the specially-programmed computerized processing device, a modifier based on the aspect of the potential transaction;
calculating, by the specially-programmed computerized processing device, a modified surety quote metric for each of the plurality of surety bond type buckets; and
outputting, by the specially-programmed computerized processing device, the modified surety quote metric for each of the plurality of surety bond type buckets.

12. A specially-programmed computerized processing device, comprising:
a computerized processor; and
a memory in communication with the processor, the memory storing specially-programmed instructions that when executed by the computerized processor result in:
receiving information descriptive of (i) a net worth of a potential surety customer and (ii) a credit rating of the potential surety customer;
calculating (i) a size scaling factor based on the net worth of the potential surety customer and (ii) a credit rating scaling factor, by dividing a credit rating scaling factor constant by a benchmark default probability that corresponds to the credit rating of the potential surety customer;
calculating a program relativity metric for each of a plurality of surety bond type buckets, by multiplying the size scaling factor, the credit rating scaling factor, and a bond obligation type scaling factor that corresponds to each of the plurality of surety bond type buckets;
selecting one of a set of maximum exposure matrices based on the net worth of the potential surety customer and the credit rating of the potential surety customer;
determining, based on the credit rating of the potential surety customer and based on the selected one of the set of maximum exposure matrices, a maximum exposure metric for each of the plurality of surety bond type buckets; and
outputting a recommended surety quote metric for each of the plurality of surety bond type buckets, by outputting the lesser of the calculated program relativity metric and the maximum exposure metric for each of the plurality of surety bond type buckets.

13. The specially-programmed computerized processing device of claim 12, wherein the memory stores specially-programmed instructions that when executed by the computerized processor further result in:
providing a menu option for each of a plurality of underwriter modification metrics;
receiving input via at least one of the menu options for the plurality of underwriter modification metrics; and
modifying based on the input received via the at least one of the menu options for the plurality of underwriter modification metrics, the recommended surety quote metric for at least one of the plurality of surety bond type buckets.

14. The specially-programmed computerized processing device of claim 13, wherein the memory stores specially-programmed instructions that when executed by the computerized processor further result in:
receiving an indication of loss data associated with a surety product for which the surety quote metric is output; and
modifying, based on the loss data, the menu options for each of the plurality of underwriter modification metrics.

15. The specially-programmed computerized processing device of claim 12, wherein the set of maximum exposure matrices comprises a set of four matrices.

16. The specially-programmed computerized processing device of claim 12, wherein the plurality of surety bond type buckets comprises eight surety bond type buckets.

17. The specially-programmed computerized processing device of claim 12, wherein the memory stores specially-programmed instructions that when executed by the computerized processor further result in:

receiving an indication of loss data associated with a surety product for which the surety quote metric is output; and modifying, based on the loss data, how one or more of the calculating processes are conducted regarding output of future surety quote metrics.

18. The specially-programmed computerized processing device of claim 12, wherein the memory stores specially-programmed instructions that when executed by the computerized processor further result in:

receiving, by the specially-programmed computerized processing device, a request to modify the recommended surety quote metric based on an aspect of a potential transaction between a surety business and the potential surety customer.

19. The specially-programmed computerized processing device of claim 18, wherein the aspect is chosen from credit issues, indemnity issues, underwriting issues, transparency issues, contract risk, financial statement quality issues, and industry classification issues.

20. The specially-programmed computerized processing device of claim 18, wherein the memory stores specially-programmed instructions that when executed by the computerized processor further result in:

receiving, by the specially-programmed computerized processing device, a modifier;

calculating, by the specially-programmed computerized processing device, a modified surety quote metric for each of the plurality of surety bond type buckets; and outputting, by the specially-programmed computerized processing device, the modified surety quote metric for each of the plurality of surety bond type buckets.

21. The specially-programmed computerized processing device of claim 20, wherein the modifier is selected from a set of predetermined modifiers.

22. The specially-programmed computerized processing device of claim 18, wherein the memory stores specially-programmed instructions that when executed by the computerized processor further result in:

calculating, by the specially-programmed computerized processing device, a modifier based on the aspect of the potential transaction;

calculating, by the specially-programmed computerized processing device, a modified surety quote metric for each of the plurality of surety bond type buckets; and outputting, by the specially-programmed computerized processing device, the modified surety quote metric for each of the plurality of surety bond type buckets.

23. A non-transitory computer-readable storage medium storing specially-programmed instructions that when executed by a computerized processing device result in:

receiving information descriptive of (i) a net worth of a potential surety customer and (ii) a credit rating of the potential surety customer;

calculating (i) a size scaling factor based on the net worth of the potential surety customer and (ii) a credit rating scaling factor, by dividing a credit rating scaling factor constant by a benchmark default probability that corresponds to the credit rating of the potential surety customer;

calculating a program relativity metric for each of a plurality of surety bond type buckets, by multiplying the size scaling factor, the credit rating scaling factor, and a bond obligation type scaling factor that corresponds to each of the plurality of surety bond type buckets;

selecting one of a set of maximum exposure matrices based on the net worth of the potential surety customer and the credit rating of the potential surety customer;

determining, based on the credit rating of the potential surety customer and based on the selected one of the set of maximum exposure matrices, a maximum exposure metric for each of the plurality of surety bond type buckets; and outputting a recommended surety quote metric for each of the plurality of surety bond type buckets, by outputting the lesser of the calculated program relativity metric and the maximum exposure metric for each of the plurality of surety bond type buckets.

24. The non-transitory computer-readable storage medium of claim 23, wherein the storage medium stores specially-programmed instructions that when executed by the computerized processing device further result in:

providing a menu option for each of a plurality of underwriter modification metrics;

receiving input via at least one of the menu options for the plurality of underwriter modification metrics; and modifying based on the input received via the at least one of the menu options for the plurality of underwriter modification metrics, the recommended surety quote metric for at least one of the plurality of surety bond type buckets.

25. The non-transitory computer-readable storage medium of claim 24, wherein the storage medium stores specially-programmed instructions that when executed by the computerized processing device further result in:

receiving an indication of loss data associated with a surety product for which the surety quote metric is output; and modifying, based on the loss data, the menu options for each of the plurality of underwriter modification metrics.

26. The non-transitory computer-readable storage medium of claim 23, wherein the set of maximum exposure matrices comprises a set of four matrices.

27. The non-transitory computer-readable storage medium of claim 23, wherein the plurality of surety bond type buckets comprises eight surety bond type buckets.

28. The non-transitory computer-readable storage medium of claim 23, wherein the storage medium stores specially-programmed instructions that when executed by the computerized processing device further result in:

receiving an indication of loss data associated with a surety product for which the surety quote metric is output; and modifying, based on the loss data, how one or more of the calculating processes are conducted regarding output of future surety quote metrics.

29. A method, comprising:

calculating, by a specially-programmed computerized processing device, a program relativity metric for each of a plurality of surety bond type buckets;

determining, by the specially-programmed computerized processing device, based on a credit rating of a potential surety customer and based on one of a set of maximum exposure matrices, a maximum exposure metric for each of the plurality of surety bond type buckets; and outputting, by the specially-programmed computerized processing device, a recommended surety quote metric for each of the plurality of surety bond type buckets, by outputting the lesser of the calculated program relativity metric and the maximum exposure metric for each of the plurality of surety bond type buckets.

* * * * *